United States Patent
Kobayashi

(10) Patent No.: US 8,953,214 B2
(45) Date of Patent: Feb. 10, 2015

(54) PRINT CONTROL METHOD, INFORMATION PROCESSING APPARATUS, AND RECORDING MEDIUM

(75) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 54 days.

(21) Appl. No.: 13/572,945

(22) Filed: Aug. 13, 2012

(65) Prior Publication Data

US 2013/0044335 A1 Feb. 21, 2013

(30) Foreign Application Priority Data

Aug. 17, 2011 (JP) ................................ 2011-178346

(51) Int. Cl.
*G06K 15/02* (2006.01)
*H04N 1/387* (2006.01)
*G06F 3/12* (2006.01)

(52) U.S. Cl.
CPC ............ *H04N 1/3875* (2013.01); *G06F 3/1211* (2013.01); *G06F 3/125* (2013.01); *G06F 3/1285* (2013.01); *G06F 2206/1508* (2013.01)
USPC ........... 358/1.2; 358/1.15; 358/1.9; 358/3.12; 358/1.16; 358/1.18; 358/1.13; 358/501; 358/401

(58) Field of Classification Search
None
See application file for complete search history.

(56) References Cited

U.S. PATENT DOCUMENTS

| | | | |
|---|---|---|---|
| 6,955,486 B2 | 10/2005 | Nishitani | |
| 7,062,402 B2 * | 6/2006 | Ternasky et al. | 702/123 |
| 2006/0017976 A1 * | 1/2006 | Mori | 358/1.18 |
| 2007/0076237 A1 * | 4/2007 | Kudo | 358/1.13 |
| 2009/0066998 A1 * | 3/2009 | Kato | 358/1.15 |
| 2009/0231620 A1 * | 9/2009 | Kaneko | 358/1.15 |
| 2010/0302589 A1 | 12/2010 | Kobayashi | |
| 2011/0058199 A1 | 3/2011 | Kobayashi | |
| 2011/0286036 A1 | 11/2011 | Kobayashi | |
| 2012/0140269 A1 | 6/2012 | Kobayashi | |
| 2012/0250076 A1 * | 10/2012 | Kumar et al. | 358/1.15 |

FOREIGN PATENT DOCUMENTS

JP 2004-007415 1/2004

* cited by examiner

*Primary Examiner* — Hilina K Demeter

(74) *Attorney, Agent, or Firm* — Harness, Dickey & Pierce, P.L.C.

(57) ABSTRACT

A print control method for an information processing apparatus connected to an image forming apparatus via a network, includes acquiring print data and print settings corresponding to the print data from one or more applications; determining whether a process related to a scaling process is included in the print settings; comparing, when determining that the process related to a scaling process is included in the print settings, a processing capacity of the image forming apparatus with a processing capacity of the information processing apparatus; and determining whether the process related to the scaling process is to be performed by the image forming apparatus or by the information processing apparatus based on the comparison result.

9 Claims, 25 Drawing Sheets

FIG.14

| INFORMATION ITEMS | CONTENTS |
|---|---|
| TYPE OF PRINT DATA | PCL5<br>PCL6<br>PostScript<br>RPCS<br>RPDL |
| PRINT SETTINGS | DOUBLE-SIDED<br>NO. OF COPIES<br>PUNCH<br>STAPLE<br>AGGREGATION<br>BINDING<br>VARIABLE MAGNIFICATION<br>REVERSE PAGE ORDER |
| PROCESSING PERFORMANCE, LOAD STATUS | PROCESSING PERFORMANCE OF PC<br>LOAD STATUS OF PC<br>PROCESSING PERFORMANCE OF PRINTER MAIN BODY<br>LOAD STATUS OF PRINTER MAIN BODY |
| CHARACTERISTICS OF PRINT DATA | WITH OR WITHOUT PASS-THROUGH DATA |

FIG.15

| DEVICES | PROCESSING PERFORMANCE | LOAD STATUS |
|---|---|---|
| PC | CPU<br>HDD(SSD) CAPACITY<br>MEMORY CAPACITY | CPU OCCUPATION RATE OF PROCESSES OTHER THAN PRINTING PROCESS<br>MEMORY USAGE AMOUNT BY PROCESSES OTHER THAN PRINTING PROCESS<br>PRIORITY LEVEL OF PRINTING PROCESS<br>FREE SPACE OF HDD<br>FREE SPACE OF MEMORY<br>INFORMATION ITEM INDICATING WHETHER ANOTHER PRINT JOB IS SPOOLED |
| PRINTER MAIN BODY | HDD CAPACITY<br>MEMORY CAPACITY | MEMORY CAPACITY USABLE FOR PRINTING PROCESS<br>WITH OR WITHOUT HDD<br>FREE SPACE OF HDD<br>FREE SPACE OF MEMORY<br>RESERVATION STATUS OF OTHER JOBS |

PRINT CONTROL METHOD, INFORMATION PROCESSING APPARATUS, AND RECORDING MEDIUM

CROSS-REFERENCE TO RELATED APPLICATIONS

The present application claims priority under 35 U.S.C §119 to Japanese Patent Application No. 2011-178346 filed Aug. 17, 2011, the entire contents of which are hereby incorporated herein by reference.

BACKGROUND OF THE INVENTION

1. Field of the Invention

The present invention generally relates to a print control program, a print control method, an information processing apparatus, and a recording medium.

2. Description of the Related Art

Generally, a printer has an imposing (layout) function to print images onto one or more physical sheets by scaling (i.e., enlarging or reducing the size of) the print data to be printed based on printing instructions from applications such as "aggregation", "bookbinding (hereinafter simplified as "binding")", and "variable magnification".

As the modules that may realize those functions, there are, for example,
a printer driver;
a print processor; and
a printer main body.

Among these, the printer driver and the print processor are modules generally included in an information processing apparatus. The information processing apparatus may also be called a Personal Computer (PC). Further, those functions may be combined to perform printing.

FIG. 1 schematically illustrates an example of aggregation printing. The example of FIG. 1 illustrates 4-in-1 aggregation printing (i.e., four-page data are printed in one page) As illustrated in FIG. 1, in the aggregation printing, a reducing process (reducing the size of an image to be printed) is performed.

FIG. 2 schematically illustrates an example of binding printing. As illustrated in FIG. 2, in the binding printing, a reducing process (a process of reducing the size of an image to be printed) is performed.

FIG. 3 schematically illustrates an example of variable magnification printing. As illustrated in the example of FIG. 3, a process of enlarging and printing a draft page is performed. As illustrated in FIG. 3, in the variable magnification printing, an enlarging process (a process of enlarging the size of an image on a draft page) or the reducing process is performed.

FIG. 4 schematically illustrates an example where the aggregation printing and the variable magnification printing are jointly performed (combined). As illustrated in FIG. 4, in the variable magnification printing, a reducing process (a process of reducing the size of an image on a draft page) is performed.

Here, in a case where those printing functions are performed by both a printer and the PC, there is a known technique in which the load of the functions may be shared (distributed) (i.e., load sharing).

For example, Japanese Laid-open Patent Publication No. 2004-007415 discloses that a PC and a printer share the load of a color matching process.

SUMMARY OF THE INVENTION

According to an aspect of the present invention, there is provided a print control method for an information processing apparatus connected to an image forming apparatus via a network. The print control method includes an acquisition step of acquiring print data and print settings corresponding to the print data from one or more applications; a process determination step of determining whether a process related to a scaling process is included in the print settings; a comparison step of, when determining that the process related to a scaling process is included in the print settings, comparing a processing capacity of the image forming apparatus with a processing capacity of the information processing apparatus; and a determination step of determining whether the process related to the scaling process is to be performed by the image forming apparatus or by the information processing apparatus based on a comparison result in the comparison step.

According to an aspect of the present invention, there is provided an information processing apparatus connected to an image forming apparatus via a network. The information processing apparatus includes an acquisition unit configured to acquire print data and print settings corresponding to the print data from one or more applications; a process determination unit configured to determine whether a process related to a scaling process is included in the print settings; a comparison unit configured to, when determining that the process related to a scaling process is included in the print settings, compare a processing capacity of the image forming apparatus with a processing capacity of the information processing apparatus; and a determination unit configured to determine whether the process related to the scaling process is to be performed by the image forming apparatus or the information processing apparatus based on a comparison result by the comparison unit.

BRIEF DESCRIPTION OF THE DRAWINGS

Other objects, features, and advantages of the present invention will become more apparent from the following description when read in conjunction with the accompanying drawings, in which:

FIG. 14 is a drawing illustrating an example of information items used to determine a module;

FIG. 15 is a drawing illustrating information items illustrating a processing performance and a load status;

DETAILED DESCRIPTION OF THE PREFERRED EMBODIMENTS

Figure 1:
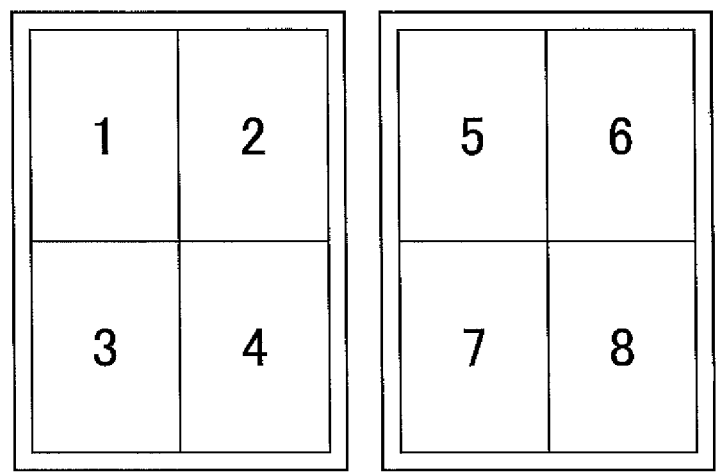
FIG. 1 is a drawing illustrating an example of aggregation printing.
Figure 2:
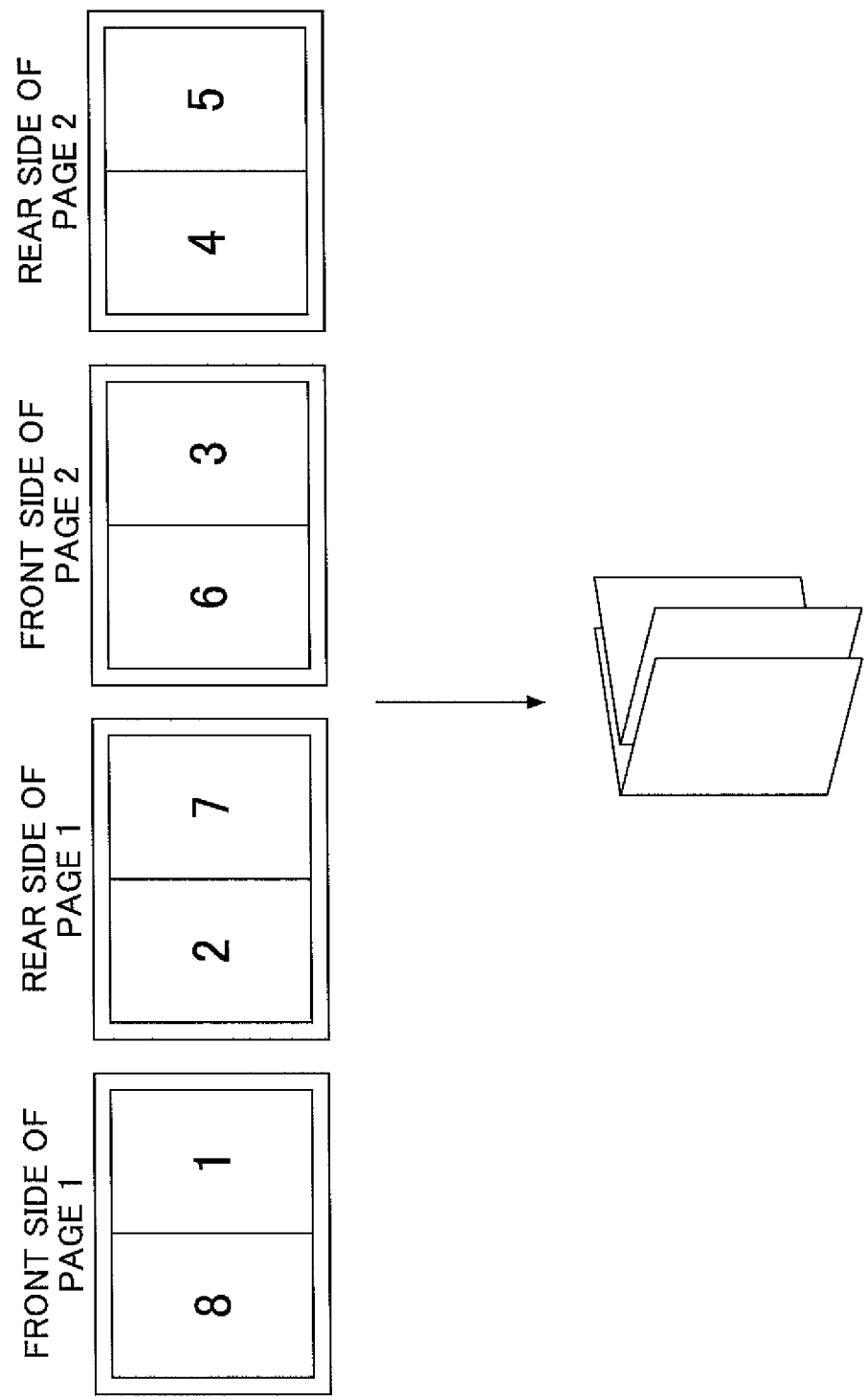
FIG. 2 is a drawing illustrating an example of binding printing.
Figure 3:
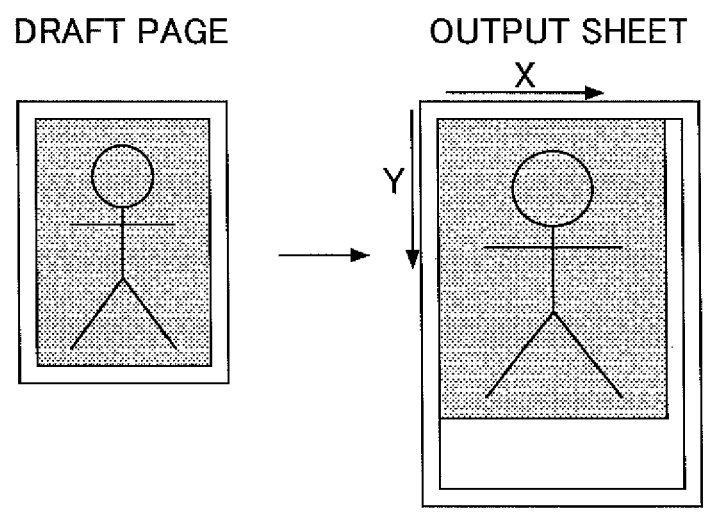
FIG. 3 is a drawing illustrating an example of variable magnification printing.
Figure 4:
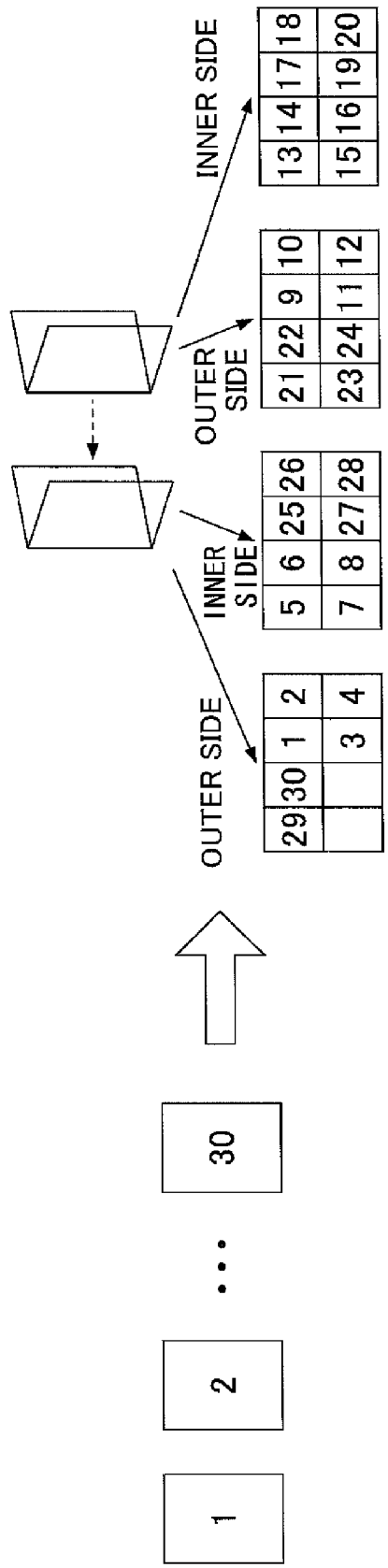
FIG. 4 is a drawing illustrating an example of a combination of the aggregation printing and the binding printing.

In related art, a module to enlarge or reduce print data (i.e., scale the print data) to be printed based on an instruction from an application has been fixed (determined) in a printing process where print data flow from the application on a PC to a printer main body via a printer driver.

In this case, for example, if the enlarging or reducing (scaling) function is performed by the printer driver, the printer main body may not perform the scaling function (i.e., the printer main body performs printing without changing the size of the image to be printed.

Namely, although both a module of the PC and a module of the printer main body may perform the scaling function, the module to perform the scaling function is fixed. Therefore, it is not possible to appropriately change (select) the module (to perform the scaling function) depending on a print job.

Further, the functions such as the "aggregation" and the "binding" may not be achieved when print data are sequentially processed from the first page one by one. Namely, to achieve (realize) those functions, it is desired to use a storage medium (i.e., a memory, a Hard Disk Drive (HDD)) or a Solid State Drive (SDD).

For example, in case of the aggregation printing, plural pages of print data may be printed on a single physical sheet. Therefore, it is desired to use a storage medium to store plural pages of the print data to be printed as the data to be printed in the single page in the aggregation printing, the plural pages of the print data being from an application.

More specifically, for example, when as many as four pages of print data are printed in a single sheet ("aggregation 4"), it is desired for the storage medium or the like to store as many as four pages of print data.

In the same manner, in a "magazine printing" which is one kind of the binding printings, it is desired for the storage medium or the like to store all pages of the print data received from an application so that, for example, the first page and the last page of the print data may be printed in the same physical sheet.

To achieve (realize) the functions, it becomes necessary to use such a storage medium. Further, a capability of processing the data may also become necessary. A recent model PC or printer may have a higher performance due to the hardware configuration. On the other hand, a conventional (older) PC or printer may not have sufficient processing capability, and as a result, printing speed may be reduced.

Therefore, if it is not possible to change the module to perform the scaling process, there may a case where the module having a lower processing capability may have to perform the scaling process.

As described above, in related art, it is not possible to determine the appropriate module of the PC or the printer to perform the scaling process of enlarging or reducing the print data to be printed.

The present application is made in light of the above circumstance, and may provide a print control method, a print control program, an information processing apparatus, and a recording medium that determine the appropriate module of the PC or the printer to perform the scaling process.

According to an embodiment of the present invention, it may become possible to determine an appropriate module to perform the scaling process.

In the following, embodiments of the present invention are described with reference to the accompanying drawings. Further, in the embodiments below, an image forming apparatus may be, for example, a Multifuntion Peripheral (MFP) having a printer function, a scanner function, a copy function, and a facsimile function in the single chassis, or may be a printing apparatus (e.g., a printer) having at least the printing function.

Pass Through

First, the print data having a special format and included in the print data delivered from an application are described. The print data having the special format correspond to a Page Description Language (PDL) code directly generated by the application and are a processing system (pass through) to be transmitted to a printer via a printer driver.

In the pass through, print attribute changes in a specific page. To correspond to the print attribute, when an image is rotated or scaled by the printer driver or a print processor, the data other than the pass-through data will be rotated or scaled.

However, the pass-through data are not changed by the printer driver and the printer. Therefore, only the data other than the pass-through data are rotated or scaled, and the printing result may not be output as the user intended. A specific example of the pass through, the PostScript (registered trademark) is well known.

Figure 5:
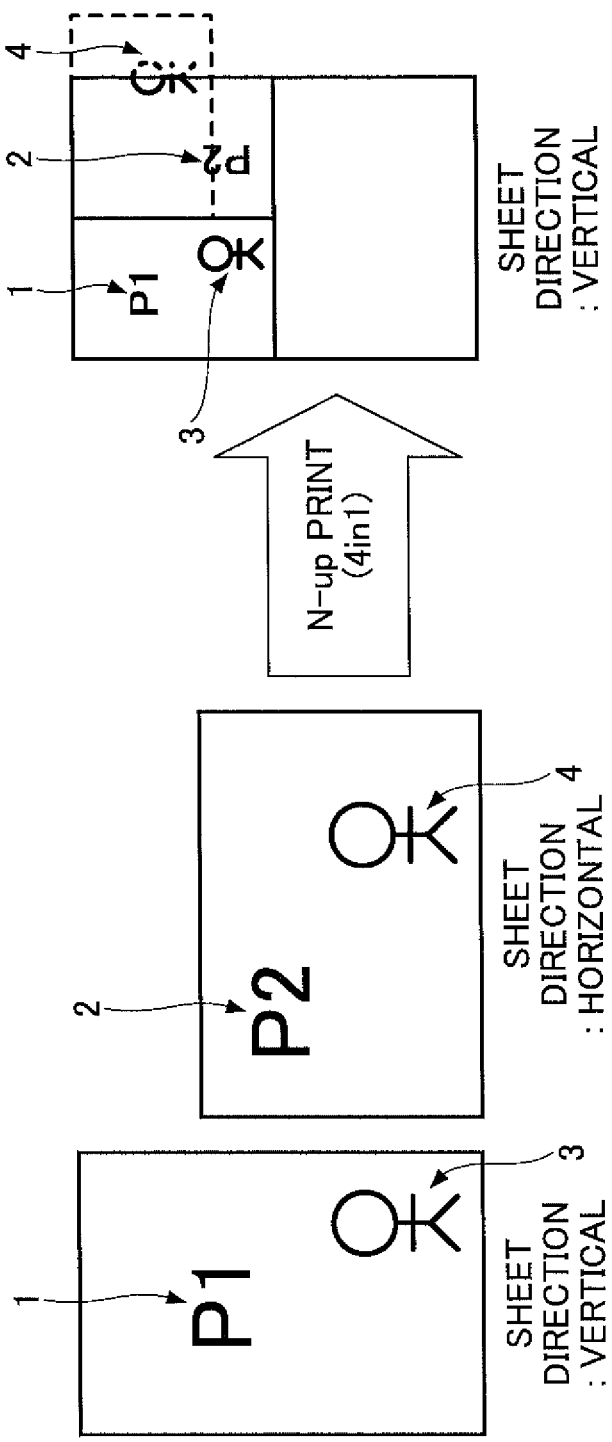
FIG. 5 is a drawing illustrating an example where only an object corresponding to pass-through data (which may also be called a "pass-through object") is not rotated.

Here, a problem of the print data including the pass-through data is described with reference to a specific example. FIG. 5 illustrates an example where only an object corresponding to the pass-through data (which may also be called a "pass-through object") is not rotated.

In the example of FIG. 5, there are data for total two pages (where the first page has the vertical sheet direction and the second page has the horizontal sheet direction) of a document, the data including objects 1 and 2 corresponding non pass-through data (herein may be referred to as a non-pass-though objects) and the pass-through objects 3 and 4. In printing of the data, a case is considered where the data are rotated in the counterclockwise direction by 90 degrees by the print processor and then, the 4-in-1 aggregation printing is performed on the rotated data. In this case, the non-pass-though object 2 is rotated, but the pass-through object 4 is not rotated. Therefore, the image of the printing result may be collapsed (broken).

Figure 6:
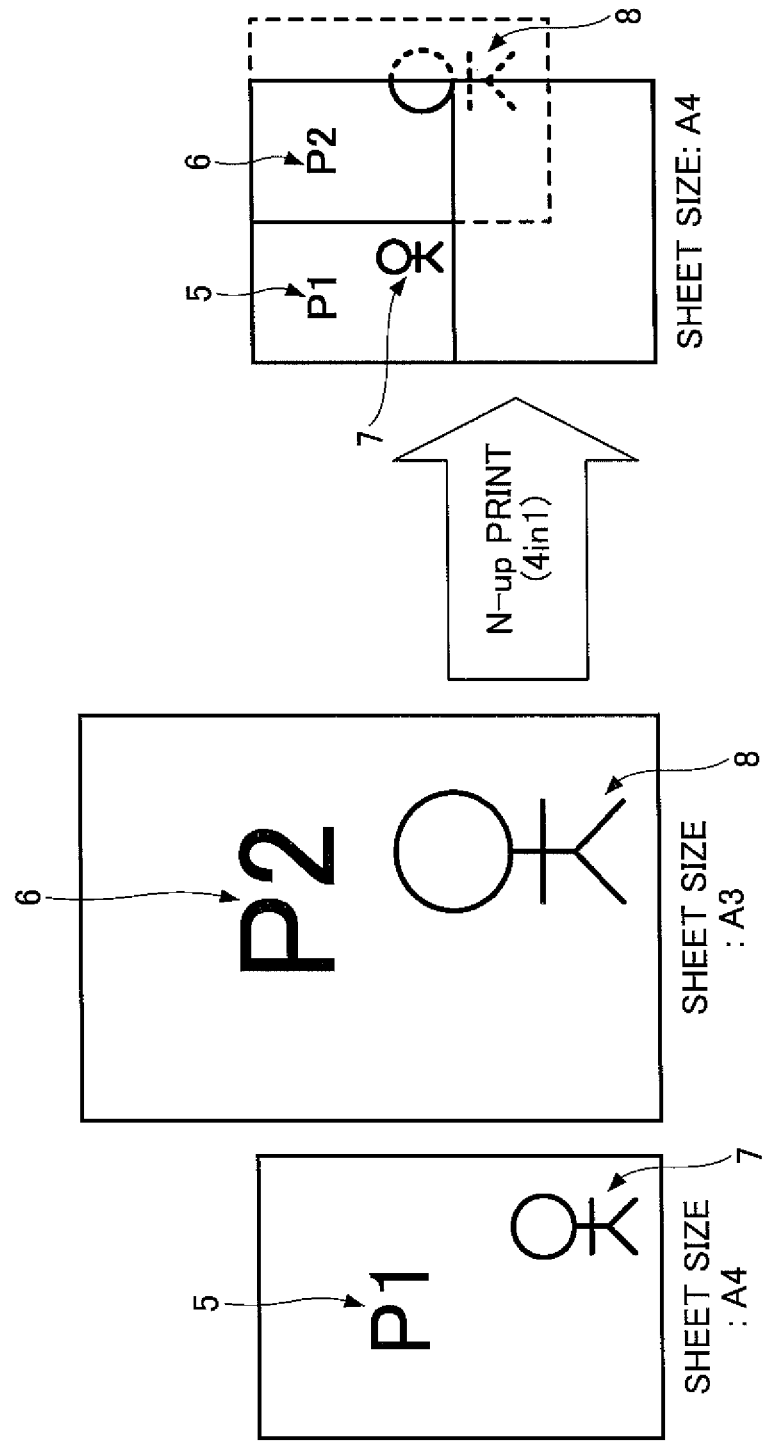
FIG. 6 is a drawing illustrating an example where only the pass-through object is not reduced.

Next, FIG. 6 illustrates a case where only the pass-through data are not reduced (scaled). In the example of FIG. 6, there are data for total two pages (where the size of the first page is A4 and the size of the second page is A3) of a document, the data including non-pass-though objects 5 and 6 and the pass-through objects 7 and 8. In printing of the data, a case is considered where the print processor performs the reducing process, and then, the printer performs the 4-in-1 aggregation printing. In this case, the size of the non-pass-though object 2 is rotated (scaled), but the size of the pass-through object 6 is not reduced. Therefore, the image of the printing result is distorted (incorrect) (i.e., the print result is different from what the user expected (desired)).

In the embodiments of the present invention described below, even the print data including the pass-through data are printed, the printing result as expected by the user may be output. Further, it is possible to determine an appropriate module to perform the scaling (enlarging and reducing) process.

System

Figure 7:
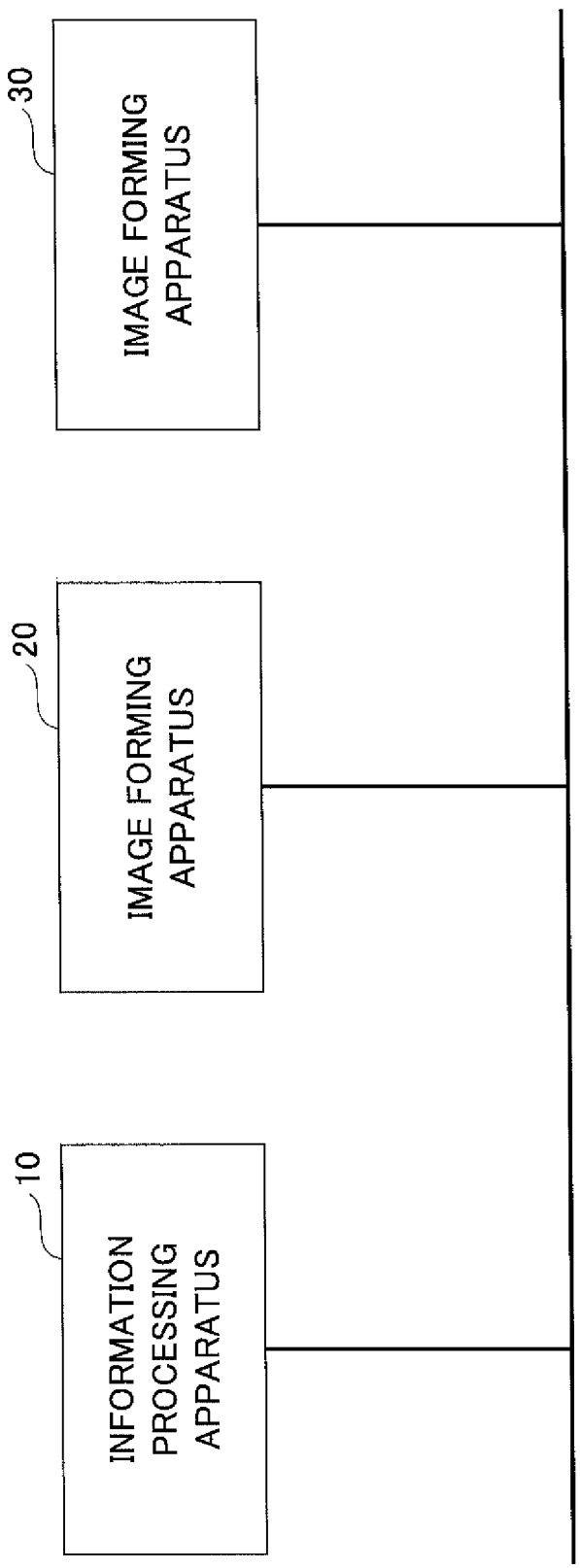
FIG. 7 is a drawing illustrating an example of a print system according to an embodiment.

FIG. 7 illustrates an example of a printing system according to an embodiment. The printing system of FIG. 7 includes an information processing apparatus 10 and image forming apparatuses 20 and 30, where all of the apparatuses are connected to each other via a network. In the following, a case is described where the image forming apparatuses 20 and 30 are printers. Via the network, the information processing apparatus 10 is in bidirectional communication with the image forming apparatuses 20 and 30. It should be noted that the numbers of the apparatuses connected via the network are not limited to the numbers of the apparatuses illustrated in FIG. 7.

Hardware

Figure 8:
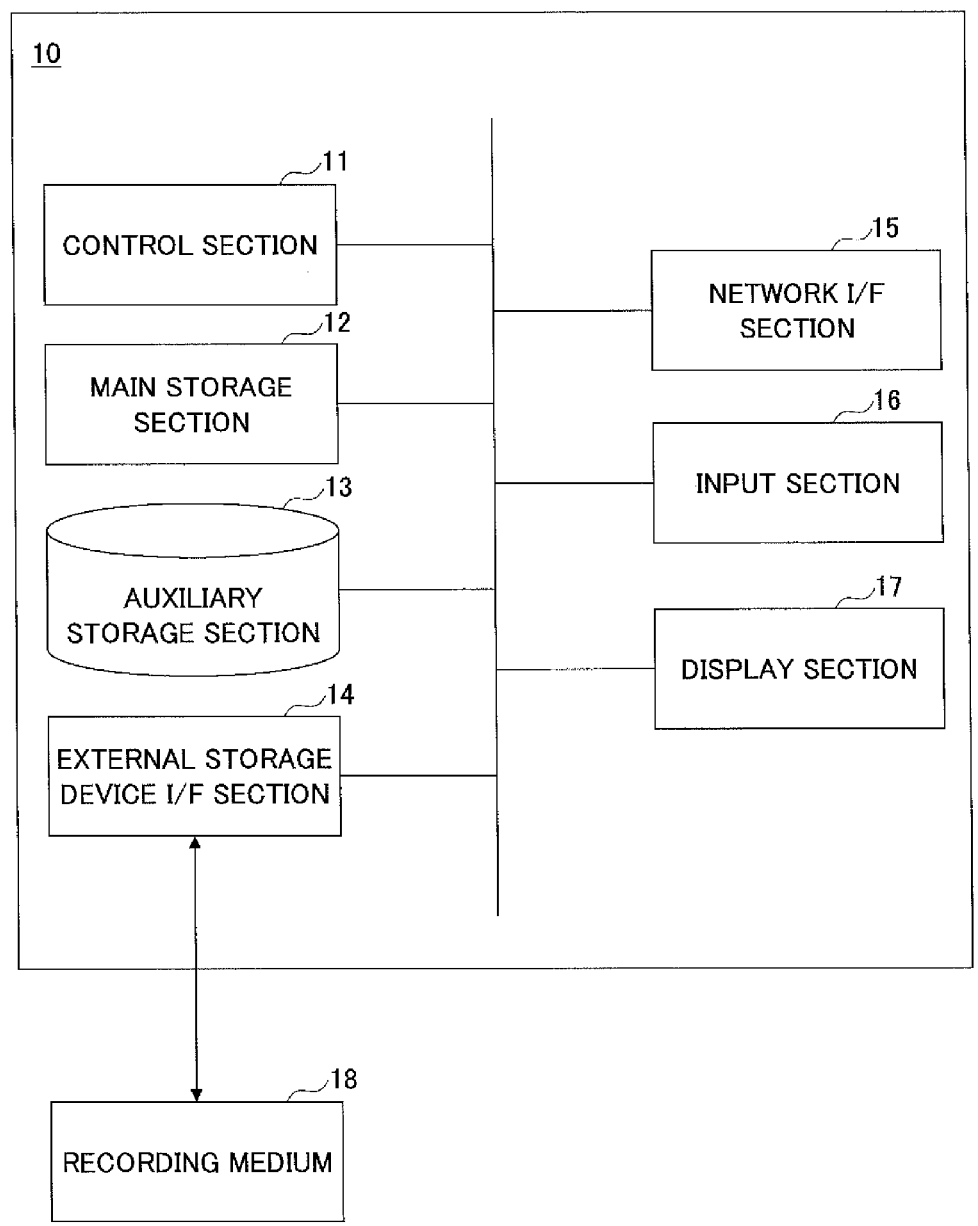
FIG. 8 is a block diagram illustrating an example of a hardware configuration of an information processing apparatus according to an embodiment.

FIG. 8 is a block diagram of an example hardware configuration of the information processing apparatus 10. As illustrated in FIG. 8, the information processing apparatus 10 includes a control section 11, a main storage section 12, an auxiliary storage section 13, an external storage device interface (I/F) section 14, a network I/F section 15, an input section 16, and a display section 17. Those elements are connected to each other via a bus so as to mutually transmit and receive data.

The control section 11 is a Central Processing Unit (CPU) to control devices, calculate data, and perform processes in the computer. Further, the control section 11 is an arithmetic device to execute a program stored in the main storage section 12 or the auxiliary storage section 13 and receive data from an input device or a storage device, performs calculations, processes on the received data, and then, output the data to an output device or the storage device.

The main storage section 12 may be a Read Only Memory (ROM), a Random Access Memory (RAM) or the like, and is a storage device storing or temporarily storing programs and data, the programs including an Operating Software (OS) which is a fundamental software executed by the control section 11.

The auxiliary storage section 13 may be, for example, an HDD, and is a storage device storing data related to the application software.

The external storage device I/F section 14 is an interface between a recording medium 18 (e.g., a flash memory) and the information processing apparatus 10 via a data transmission path such as a Universal Serial Bus (USB).

Further, a predetermined program is stored in the recording medium 18, so that the predetermined program stored in the recording medium 18 may be installed in the information processing apparatus 10 via the external storage device I/F section 14. The predetermined program installed therein is executable by the information processing apparatus 10.

The network I/F section 15 is an interface between a peripheral device and the information processing apparatus 10, the peripheral device having a communication function and being connected to the network I/F section 15 via a network such as a Local Area Network (LAN) or a Wide Area Network (WAN) provided by a data transmission path such as a wired and/or wireless line.

The input section 16 includes, for example, a keyboard including cursor keys, figure keys, and various keys, a mouse to select keys displayed on the screen of the display section 17 and a slice pad. Further, the input section 16 is a user interface where a user inputs instructions to the control section 11 and data.

The display section 17 may be, for example, a Cathode Ray Tube (CRT), a Liquid Crystal Display (LCD) or the like, and displays data in accordance with the display data input by the control section 11.

Function

Next, the functions of the information processing apparatus 10 (i.e., a PC) are described. Here, as a print architecture, for example, there are two spooling types: a RAW spooling and Enhanced Meta File (EMF) spooling. In the following, those two print architectures are described one by one.

RAW Spooling

Figure 9:
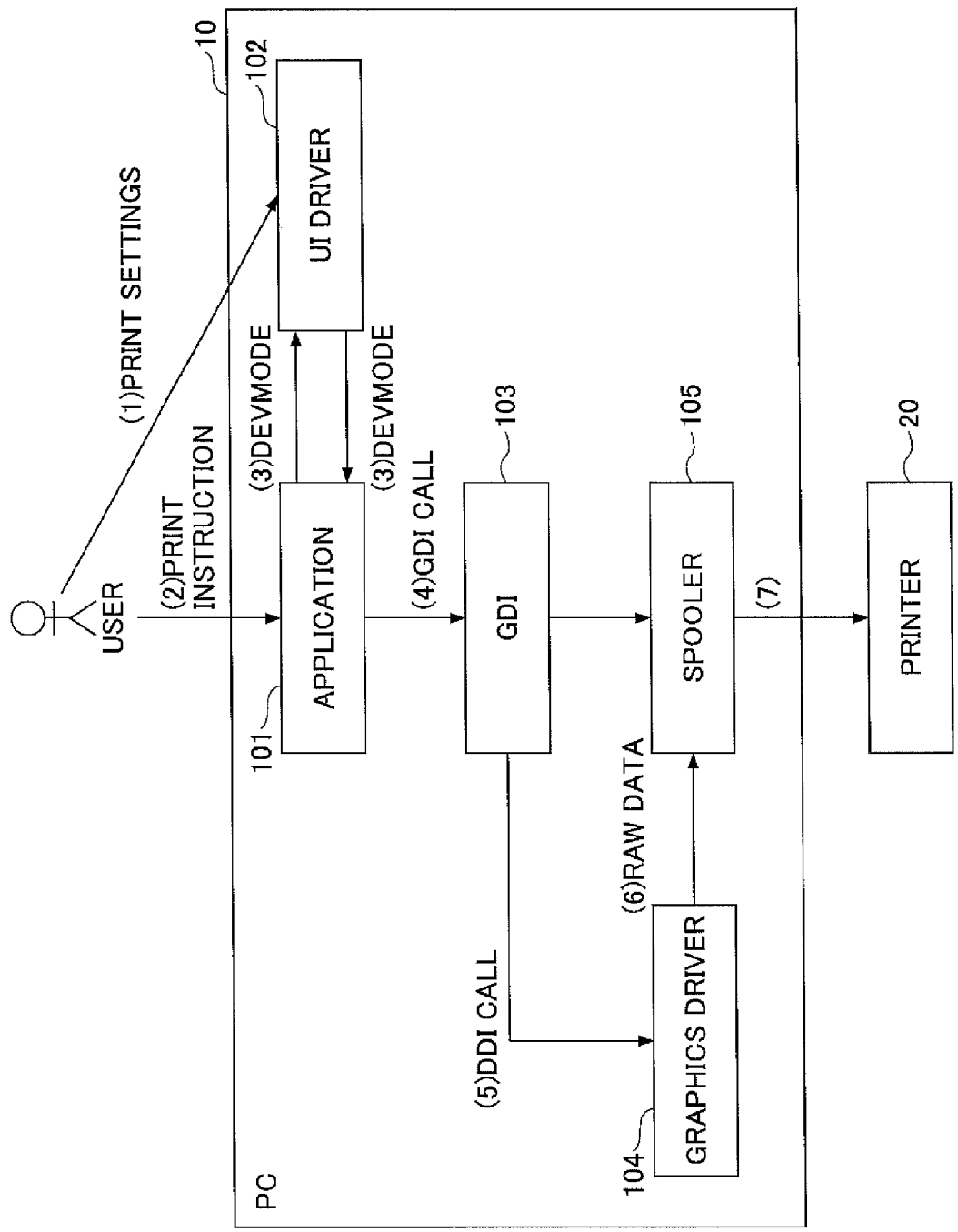
FIG. 9 is drawing illustrating an example of a data flow in a RAW spooling.

FIG. 9 illustrates an example of a data flow in the RAW spooling. In the example of FIG. 9, the PC 10 includes an application 101, a User Interface (UI) driver 102, a Graphic Device Interface (GDI) 103, a graphics driver 104, and a spooler 105. The UI driver 102 and the graphics driver 104 are functions of the printer driver. The GDI 103 and the spooler 105 are functions of the Operating System (OS).

The user may perform printing via (using) the application 101. A process of print control in the PC is as follows:

(1) the user changes print settings using a Graphic User Interface (GUI) provided by the UI driver 102;
(2) the user issues a print instruction to the application 101;
(3) the application 101 receives the user's print settings by communicating a structure called DEVMODE including print settings with the UI driver 102;
(4) the application 101 transmits the print instruction to the GDI 103 as a GDI call;
(5) the GDI 103 transmits the GDI call via a Device Driver Interface (DDI) to the graphics driver 104;
(6) the graphics driver 104 transmits RAW data to the spooler 105, the RAW data having been converted so as to be readable (understood) by the printer 20; and
(7) the spooler 105 transmits the RAW data received from the graphics driver 104 to the printer 20.

Here, the graphics driver 104 determines (selects) an appropriate module from among the module of the PC 10 and the module of the printer 20 based on the print data, the print settings, processing capacity (processing ability) of the modules, and the like, so that the determined module is to perform scaling (i.e., enlarging or reducing the size of the print data to be printed).

Functions of Information Processing Apparatus

Figure 10:
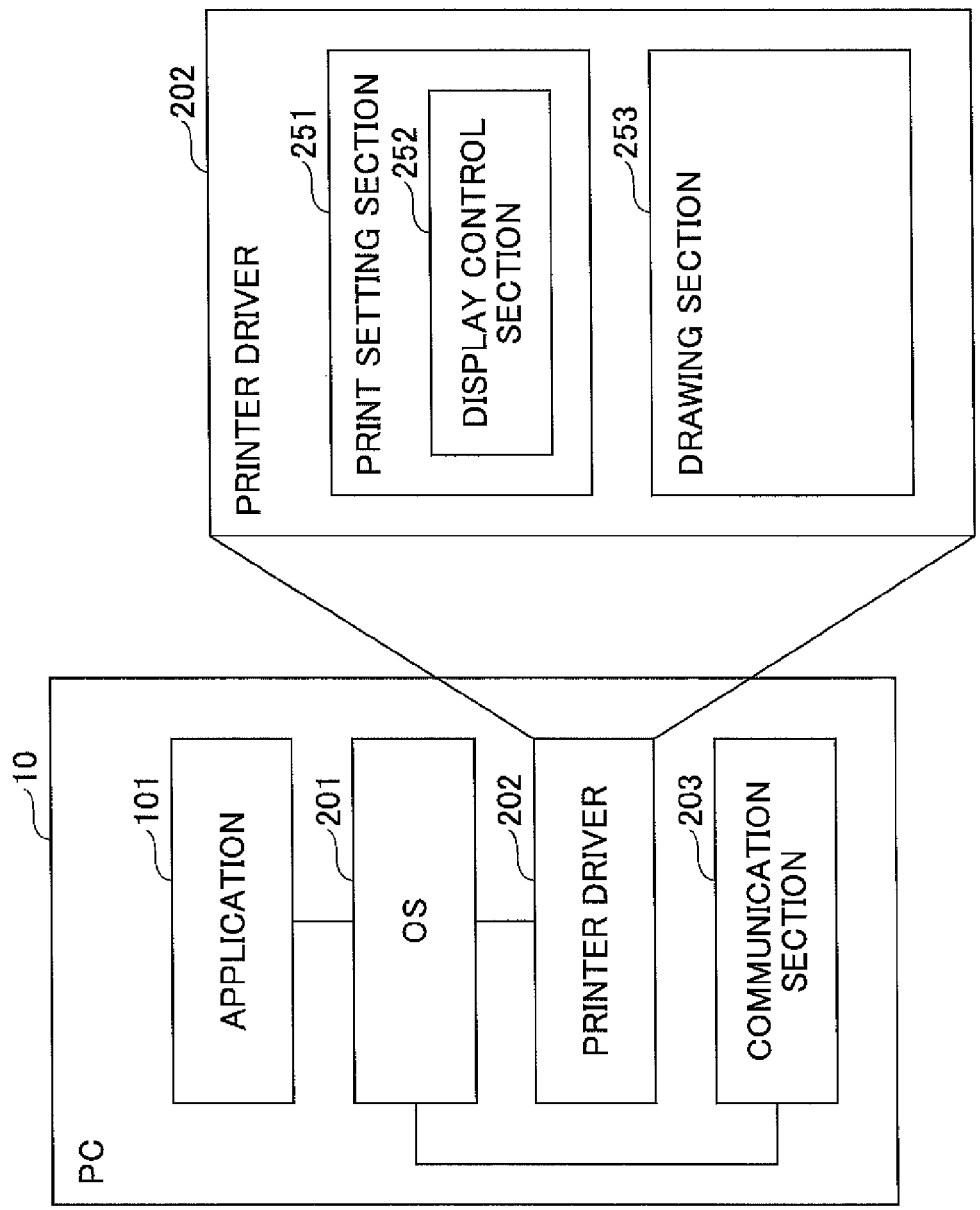
FIG. 10 is a block diagram illustrating an example of the functions of the information processing apparatus in the RAW spooling.

FIG. 10 is a block diagram illustrating an example of the functions of the information processing apparatus (PC) 10 in the RAW spooling. In the example of FIG. 10, the PC 10 includes the application 101, an OS 201, a printer driver 202, and a communication section 203.

The application 101 may be, for example, Word or Excel (registered trademarks), and draws the contents to be printed using an Application Program Interface (API) provided by the OS 201.

The OS 201 converts (transforms) the print instruction from the application 101 into a drawing instruction (DDI call) to be used for the printer driver 202.

The printer driver 202 converts the drawing instruction (DDI call) from the OS 201 into a PDL command (RAW data) that can be readable by the printer 20.

The communication section 203 transmits the spooled RAW data to the printer 20. Further, the communication section 203 acquires the information items indicating the processing performance and the load status of the printer 20 from the printer 20.

Further, the printer driver 202 includes a print setting section 251 and a drawing section 253. The print setting section 251 includes a display control section 252. The display control section 252 displays and controls the screen where the user may perform the print settings, and accepts the change of the print settings by the user.

Figure 11:
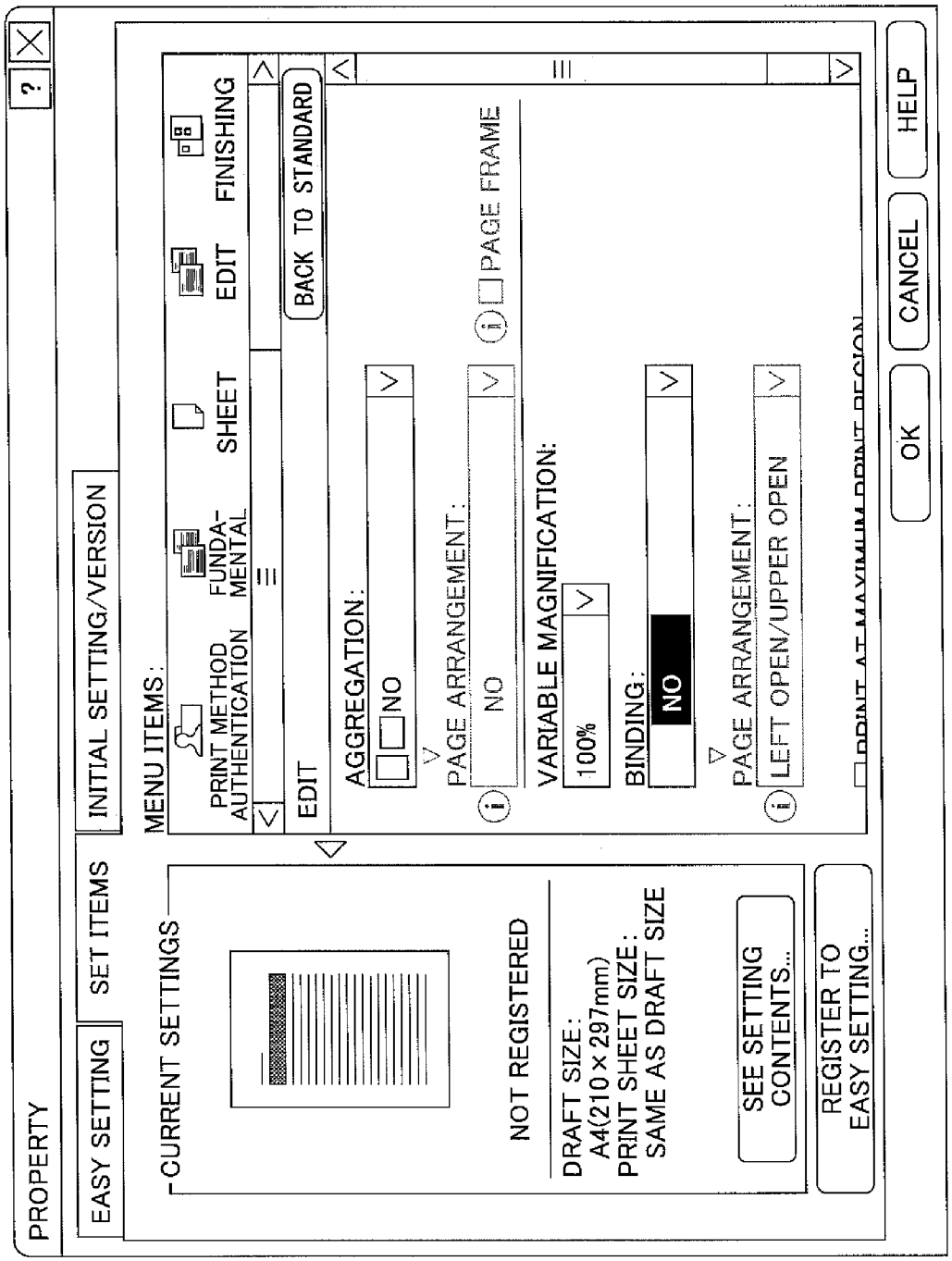
FIG. 11 is a drawing illustrating an example of a UI provided by a print setting section.

FIG. 11 illustrates an example of the User Interface (UI) provided by the print setting section 251. For example, the user may set various settings for such as the aggregation printing, binding printing, and variable magnification printing using the UI illustrated in FIG. 11.

Referring back to FIG. 10, the drawing section 253 acquires the print data, and, if necessary, performs the imposing (layout) process on the print data. Further, the drawing section 253 converts the print data into the PDL command, and output the PDL command to the spooler 105.

Herein, the term "imposing process" refers to a process where plural pages of print data are arranged based on a bookbinding specification, so that the pages are arranged in accordance with the order of the pages when the bookbinding is done.

Further, the "print data" herein refers to a general term of the image data in printing, the image data including the GDI call, the DDI call, the RAW data and the like. Further, the print setting section 251 and the drawing section 253 correspond to the UI driver 102 and the graphics driver 104, respectively.

Figure 12:
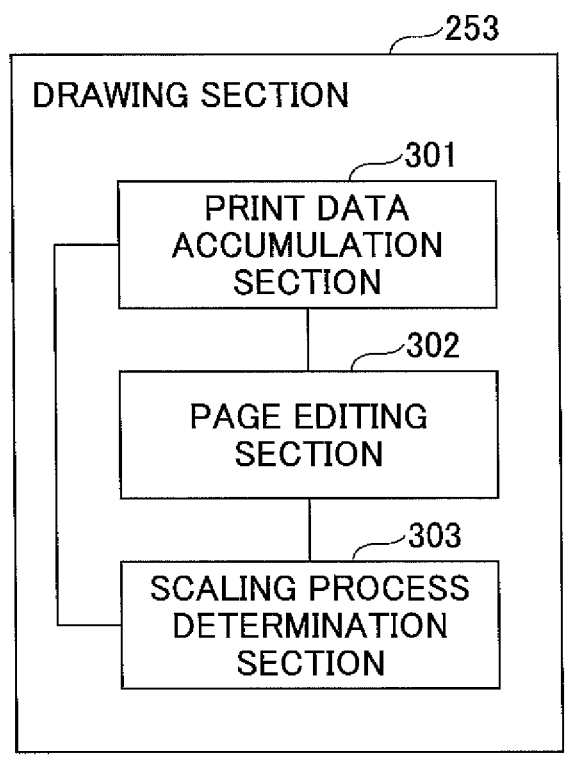
FIG. 12 is a block diagram illustrating an example of functions of a drawing section.

FIG. 12 is a block diagram illustrating an example of the functions of the drawing section 253. The drawing section 253 of FIG. 12 includes a print data accumulation section 301, a page editing section 302, and a scaling process determination section 303.

The print data accumulation section 301 sequentially receives the print data based on the print instructions from the application 101, and stores them so as to be referred to for the later processes.

The page editing section 302 acquires the print data to be pasted (printed) onto one or more actual physical sheets from among the print data accumulated (stored) in the print data accumulation section 301. Further, the page editing section 302 performs editing (e.g. performs the imposing process) by enlarging and reducing (scaling) the sizes of the print data. More specifically, for example, upon receiving an instruction to perform a process from the scaling process determination section 303, the page editing section 302 performs the imposing process and the like by scaling (enlarging or reducing the sizes of) the print data.

The scaling process determination section 303 determines (selects) an appropriate module to perform the scaling process from among the module of the PC 10 and the module of the printer 20 based on the print data, the print settings, the processing capacity (processing ability) of the modules of the PC 10 and the printer 20 and the like. Namely, the scaling process determination section 303 determines which of the PC 10 and the printer 20 is to perform the scaling based on the above conditions. The scaling process determination section 303 transmits the determined result to the page editing section 302. Details of the scaling process determination section 303 are described below with reference to FIG. 13.

Figure 13:
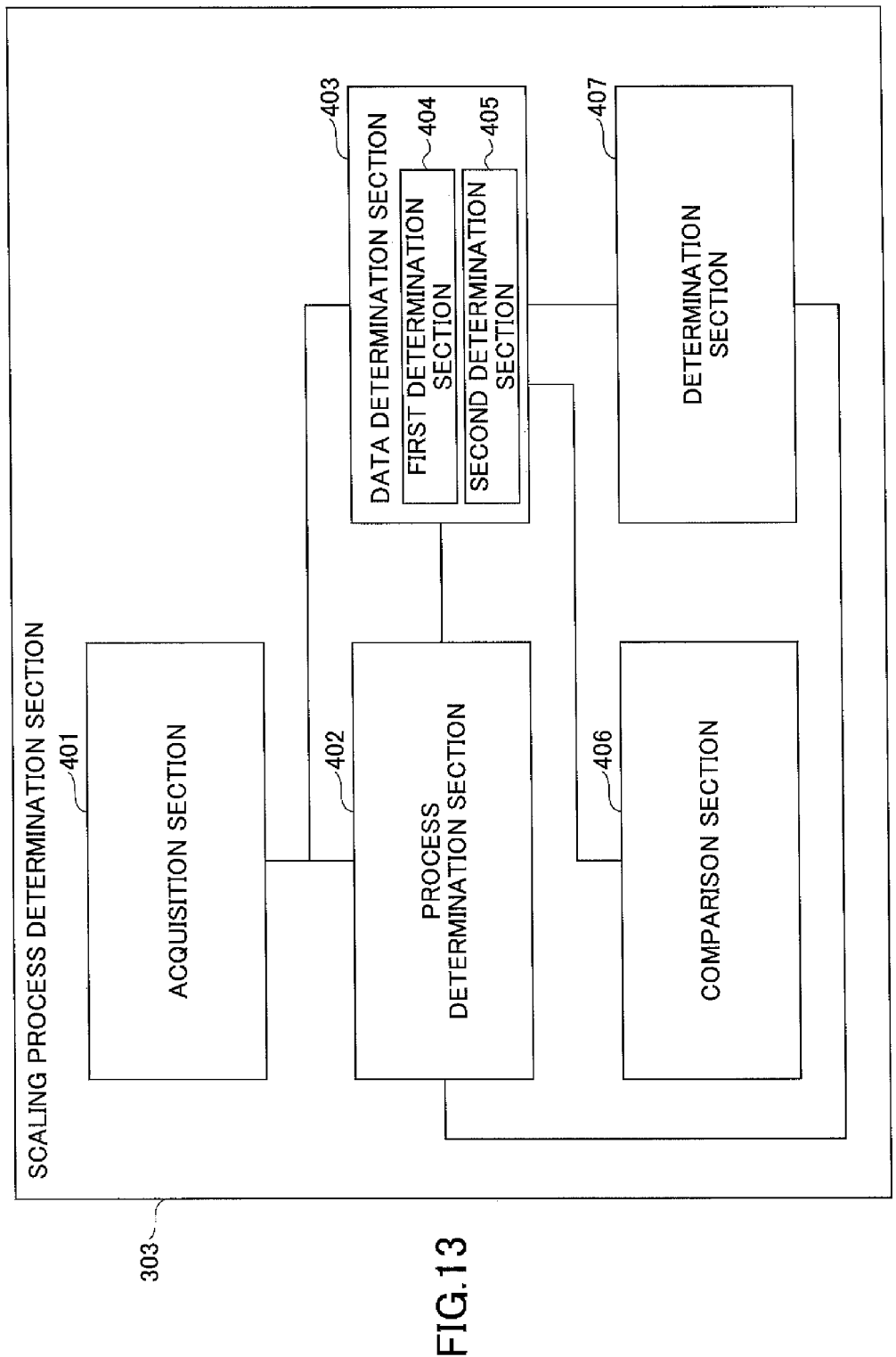
FIG. 13 is a block diagram illustrating an example of a scaling process determining section.

FIG. 13 is a block diagram illustrating an example of the functions of the scaling process determination section 303. The scaling process determination section 303 of FIG. 13 includes an acquisition section 401, a process determination section 402, a data determination section 403, a comparison section 406, and a determination section 407.

The acquisition section 401 acquires the print settings and the print data from the OS 201. The print data acquired from the OS 201 are the print data corresponding to the print instructions from the application 101. Further, the print data may include pass-through data. The acquisition section 401 outputs the acquired print settings to the process determination section 402, and outputs the acquired print data to the data determination section 403.

The process determination section 402 determines whether the print settings include a process related to the scaling process (i.e., the enlarging process and the reducing process). The process related to the scaling process herein refers to, for example, the aggregation printing, the binding printing, the variable magnification printing, and the like.

When determining that the print settings include the process related to the scaling process, the process determination section 402 reports the determination result to the data determination section 403. On the other hand, when determining that the print settings do not include the process related to the scaling process, the process determination section 402 reports the determination result to the determination section 407.

Upon receiving the report indicating that the print settings include the process related to the scaling process, the data determination section 403 analyzes the print data to determine whether the pass-through data are included in the print data. The data determination section 403 includes a first determination section 404 and a second determination section 405.

The first determination section 404 determines the type of the print data. This is because the pass-through data may be included depending on the type of the print data. For example, PCL5, PCL6, and PostScript are types of print data that may include the pass-through data. On the other hand, for example, RPCS and RPDS are types of the print data that do not include the pass-through data.

When determining that the print data of the determined type may include the pass-through data, the first determination section 404 reports the determination result to the second determination section 405. On the other hand, when determining that the print data of the determined type do not include the pass-through data, the first determination section 404 reports the determination result to the comparison section 406.

Upon receiving the report indicating that the print data of the determined type may include the pass-through data, the second determination section 405 determines whether the pass-through data are included in the print data. In this case, whether the pass-through data are included in the print data may be determined based on whether the PDL code is included in the print data. For example, by doing this, when determining that the pass-through data are included in the print data, the second determination section 405 reports the determination result to the determination section 407.

On the other hand, when determining that the pass-through data are not included in the print data, the second determination section 405 reports the determination result to the comparison section 406.

Further, it should be noted that the first determination section 404 is not always necessary. In this case, upon receiving the report indicating that the scaling process is to be performed, the second determination section 405 may determine whether the pass-through data are included in the print data.

Upon receiving the report indicating that the print data of the determined type do not include the pass-through data from the first determination section 404 and/or upon receiving the report indicating that the pass-through data are not included in the print data from the second determination section 405, the comparison section 406 compares between the processing capacity of the PC 10 and the processing capacity of the printer 20.

The comparison section 406 acquires the information items indicating the processing performance and the load status of the PC 10 and the information items indicating the processing performance and the load status of the printer 20 in advance. Herein, the term "processing capacity" is used as the term including both the processing performance and the load status. Those information items are acquired when, for example, the printing is directed by the application 101. The comparison section 406 reports the comparison result to the determination section 407.

In the comparison of the processing capacities, the comparison section 406 may compare only one of the processing performance and the load status between the PC 10 and the printer 20. Further, for example, the comparison section 406 may compare the scores calculated by weighting the information items to determine which processing capacity is higher between the PC 10 and the printer 20.

The determination section 407 determines (selects) the PC 10 or the printer 20 as the device that is to perform the process related to the scaling process based on the comparison result made by the comparison section 406 and/or the determination result made by the second determination section 405. When determining that the pass-through data are included in the print data, the determination section 407 determines that the process related to the scaling process is to be performed by the printer 20. On the other hand, when determining that the pass-through data are not included in the print data, the determination section 407 determines that the process related to the scaling process is to be performed by a device (the PC 10 or the printer 20) having higher processing capacity. Here, the higher processing capacity refers to, for example, a higher performance or a lower processing load.

Further, upon receiving the report indicating that the process related to the scaling process is not included from the process determination section 402, the determination section 407 does not do anything special. When determining that the process related to the scaling process is to be performed by the PC 10, the determination section 407 transmits the instructs to the page editing section 302 to perform the process related to the scaling process.

Data Example

Next, the information items that are to be used in the determination process to determine the module that is to perform the process related to the scaling process are described.

FIG. 14 illustrates an example of the information items to be used to determine the module that is to perform the process related to the scaling process. The information items of FIG. 14 includes the type of print data, the print settings, the processing performance and the load status, and the characteristics of print data.

Type of Print Data

As described above, some types of the print data do not include the pass-through data. With respect to the print data that do not include the pass-through data, the process related to the scaling process may be performed by either the PC 10 or the printer 200. Therefore, the type of print data is the information item that may be used to determine the module to perform the process related to the scaling process.

Print Settings

In a print job where none of the aggregation printing, the binding printing, and the variable magnification printing is set, it may not be necessary to share the process between the PC 10 and the printer 20. Therefore, the print settings are information items that may be used to determine the module to perform the process related to the scaling process.

Processing Performance and Load Status

As described above, it is desired to select the module of the device (the PC 10 or the printer 20) that has more performance capacity (i.e., a higher processing performance and a lower load status) to perform the process related to the scaling process. Therefore, the information item indicating the processing performance of the hardware may be used to determine the module to perform the process related to the scaling process. Further, if there are some other processes running at the same time, the information items indicating the load status may be used to determined the module as well. For example, the comparison section 406 acquires the information items indicating the processing performances and the load statuses of the PC 10 and the printer 20.

Characteristics of Print Data

When the pass-through data are included in the print data, the PC 10 may not perform the process related to the scaling process. Therefore, the characteristics of print data may be used as the information item to determine the module.

FIG. 15 illustrates an example of information items indicating the processing performances and the load statuses. As illustrated in FIG. 15, the processing performance of the PC 10 includes the process performance of the CPU (i.e., the control section 11), the capacity of the HDD (i.e., the auxiliary storage section 13), and the capacity of the memory (i.e., the main storage section 12). The processing performance of the printer 20 includes the capacity of the HDD and the capacity of the memory.

The information items indicating the load status of the PC 10 include:
(i) CPU occupation rate by processes other than printing process;
(ii) memory usage amount by processes other than printing process;
(iii) priority level of printing process;
(iv) free space of HDD; and
(v) information item indicating whether another print job is spooled.

The information items indicating the load status of the printer 20 include:
(i) with or without HDD;
(ii) free space of HDD;
(iii) free space of memory; and
(iv) reservation status of other jobs.

The comparison section 406 acquires the information items illustrated in FIGS. 14 and 15. The comparison section 406 compares at least one of the information items between the PC 10 and the printer 20. In this case, the comparison section 406 may compare scores calculated by weighting the information items between the PC 10 and the printer 20.

Function of Printer

Figure 16:
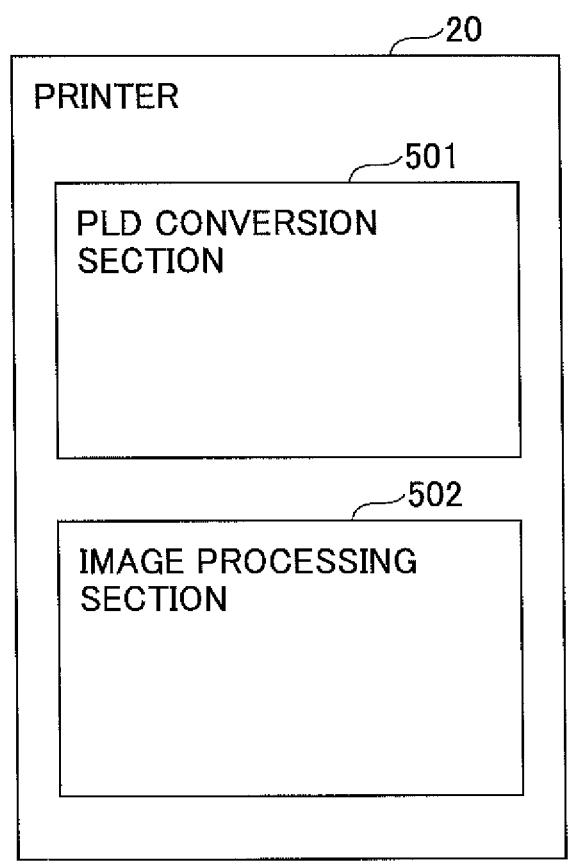
FIG. 16 is a block diagram illustrating an example of the functions of a printer.

FIG. 16 is a block diagram of an example of the functions of the printer 20. The printer 20 of FIG. 16 includes a PDL conversion section 501 and an image processing section 502.

The PDL conversion section 501 converts the PDL command received from the printer driver 202 into image data by rasterizing. It should be noted that the number of the PDL conversion sections 501 may not be one. Namely, there may be plural PDL conversion sections 501 so that the number of the PDL conversion sections 501 is the same as the number of PDLs that are supported by the printer.

In a printer that can print the PostScript (registered trademark) and the Printer Control Language (PCL), there are a PostScript conversion section and a PCL conversion section as the PDL conversion sections 501. The PDL conversion section 501 performs an image conversion process based on the PDL command. In the image conversion process, the scaling process (enlarging and reducing process) may be performed with respect to each of the pages and drawing objects.

The image processing section 502 performs a process of finally pasting the image data having been converted by the PDL conversion section 501 onto a physical sheet. In this case, the image processing section 502 may also perform the scaling process by performing a process on the image data.

By doing this, in the print control process in the RAW spooling, the scaling process determination section 303 of the printer driver 202 may determine (select) the module to perform the process related to the scaling process from among the module of the PC 10 and the module of the printer 20 based on the print data, the printer settings, the processing capacities of the PC 10 and the printer 20 and the like. Therefore, the it may become possible to appropriately share the load in the scaling process.

EMF Spooling

Figure 17:
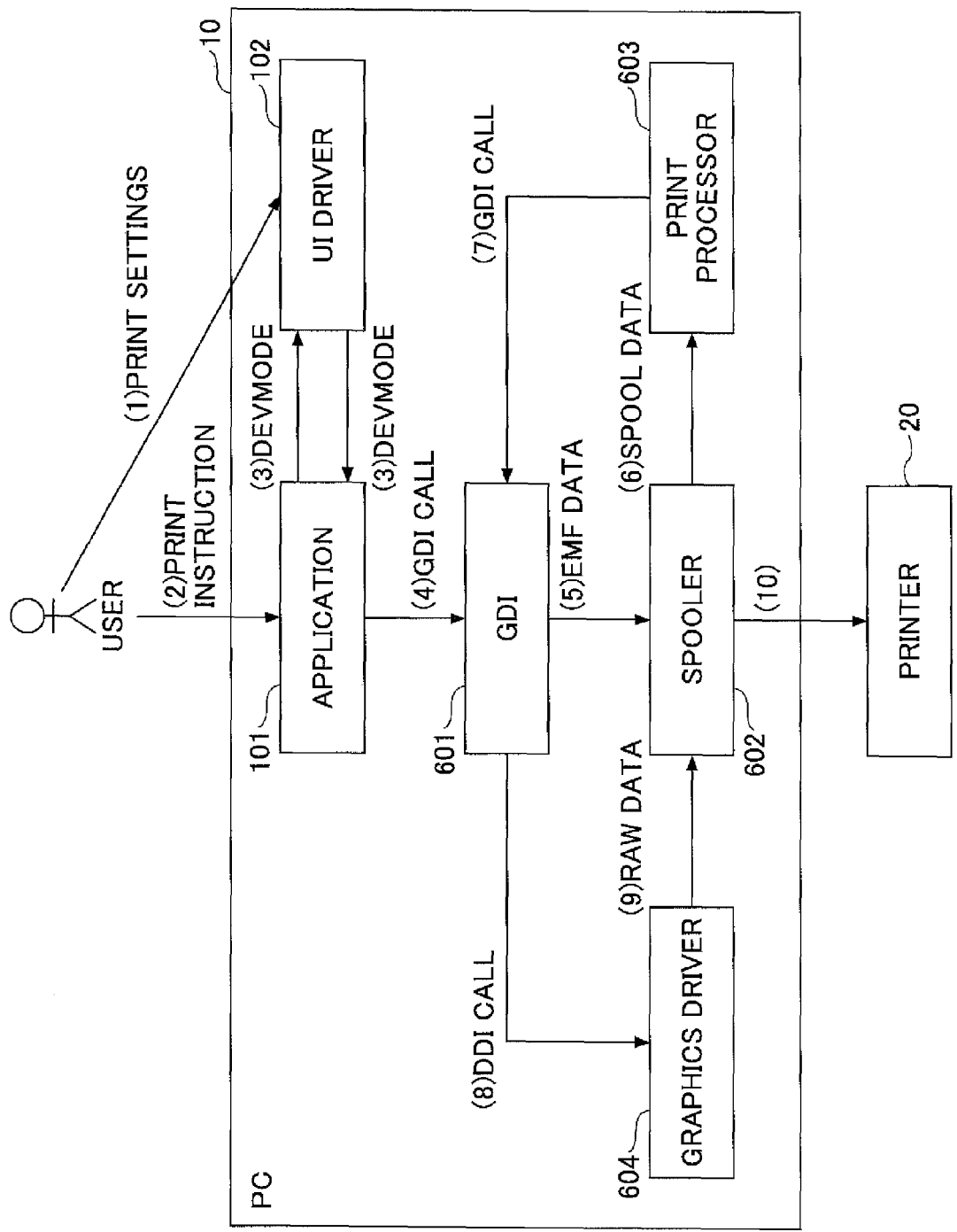
FIG. 17 is a drawing illustrating an example of a data flow in an EMF spooling.

Next, the print control in EMF spooling is described. FIG. 17 illustrates an example of a data flow in the EMF spooling. In the example of FIG. 17, the PC 10 includes the application 101, the UI driver 102, a GDI 601, a spooler 602, a print processor 603, and a graphics driver 604. The UI driver 102 and the graphics driver 604 are the functions in the printer driver. The GDI 601 and the spooler 602 are functions in the OS.

The user prints via the application 101. The print control process in the PC 10 is described as follows:
(1) the user changes print settings using the GUI provided by the UI driver 102;
(2) the user issues a print instruction to the application 101;
(3) the application 101 receives the user's print settings by communicating a structure called the DEVMODE including print settings with the UI driver 102;
(4) the application 101 transmits the print instruction to the GDI 103 as the GDI call;
(5) upon receiving the GDI call from the application 101, the GDI 601 generates and spools EMF data (spool data) in the spooler 602;
(6) after all print data of the application 101 are spooled, the spooler 602 reports that the spooled data are despooled to the print processor 603 and sends the spooled data;
(7) the print processor 603 performs the imaging process on the spooled data from one page to another based on the print settings designated by the user. For example, the print processor 603 realizes the function of the aggregation printing, the binding printing, and reverse page order printing or the like, and transmits the edited contents to the GDI 601 as the GDI call;
(8) upon receiving the GDI call, the GDI 601 converts the GDI call into a DDI call, and transmits the DDI call to the graphics driver 604;
(9) upon receiving the DDI call, the graphics driver 604 converts the DDI call into RAW data described in the language that may be readable by the printer 20 (i.e., the PDL), and transmits the RAW data to the spooler 602; and
(10) the spooler 602 outputs the RAW data received from the graphics driver 604 to the printer 20.

Here, the print processor 603 may appropriately determine (selects) the PC 10 or the printer 20 that is to perform the process related to the scaling process based on the print data, the print settings, and the performance capacities of the devices (i.e., the PC 10 and the printer 20).

Functions of Information Processing Apparatus

Figure 18:
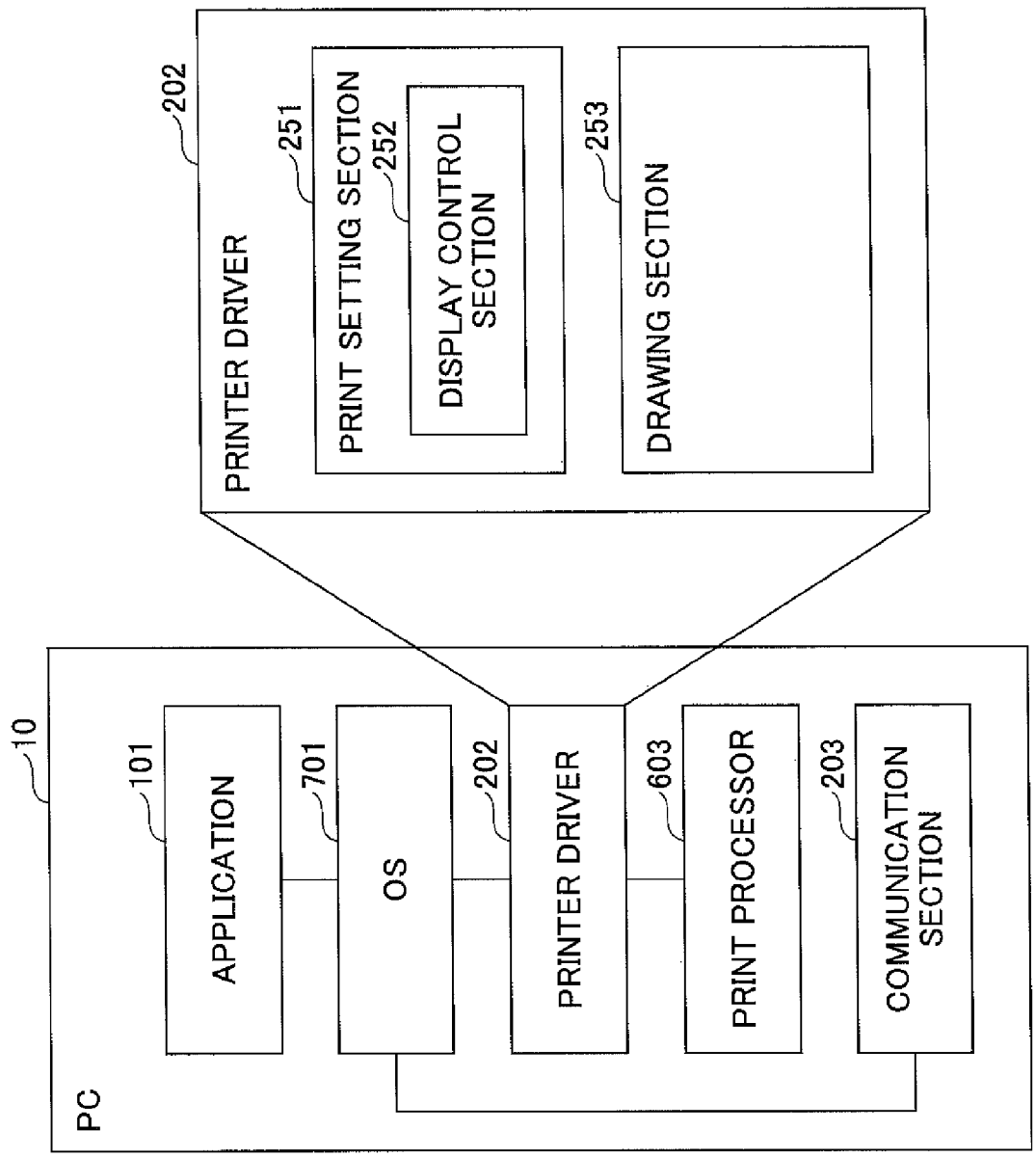
FIG. 18 is a block diagram illustrating an example of a function of the information processing apparatus in the EMF spooling.

FIG. 18 is a block diagram illustrating an example of the functions of the information processing apparatus (PC) 10 in the EMF spooling. In the example of FIG. 18, the PC 10 includes the application 101, an OS 701, the printer driver 202, the print processor 603, and the communication section 203. In FIG. 18, the same reference numerals are used to describe the same functions as those in FIG. 10, and the repeated descriptions may be omitted.

Upon receiving the GDI call from the application 101, the OS 701 generates and spools the EMF data. Further, upon receiving the GDI call from the print processor 603, the OS 701 converts the GDI call into the DDI call, and transmits the DDI call to the printer driver 202.

The print processor 603 stores the print settings via the OS 701, and performs the imposing process on the print data. The print processor 603 sends the GDI call to the OS 701 as the print data after the imposing process. Details of the print processor 603 are described below with reference to FIG. 19.

Figure 19:
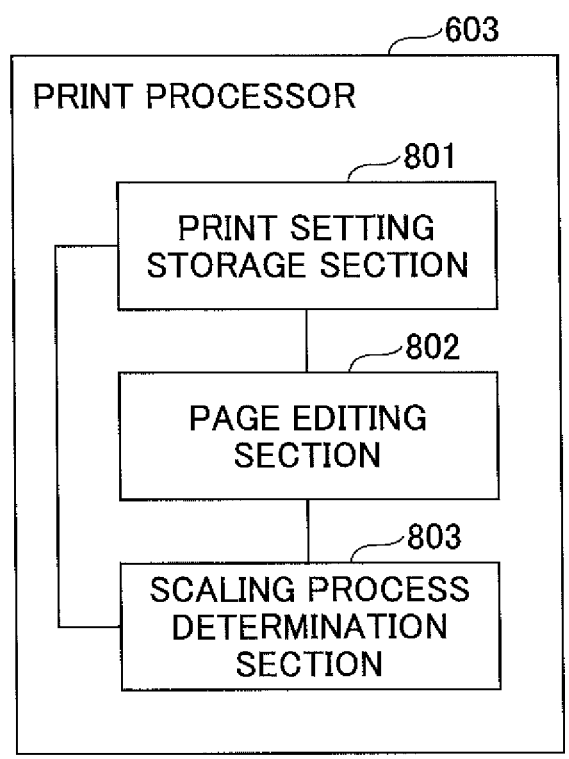
FIG. 19 is a block diagram illustrating an example of the functions of a print processor.

FIG. 19 is a block diagram illustrating an example of the functions of the print processor 603. The print processor of FIG. 19 includes a print setting storage section 801, a page editing section 802, and a scaling process determination section 803.

The print setting storage section 801 stores the print settings acquired via the OS 701. For example, the print setting storage section 801 may acquire the DEVMODE output to the GDI 601.

The page editing section 802 realizes the aggregation printing, the reverse page order printing, or the binding printing by editing (e.g., by performing the imposed process on) the print data for each of the physical sheets, the print data having been received from the application 101 via the spool file. The page editing section 802 performs a process similar to the WinPrint in Windows (registered trademarks). The page editing section 802 performs the above process upon the receipt of a process request from the scaling process determination section 803.

Further, unlike the printer driver 202, the print data accumulation section may not be necessary. This is because, in the EMF spooling printing of the print architecture of the Windows (registered trademark), the print data accumulation is performed by the spooler 602 which is one of the OS modules in the Windows.

The print processor 603 may take and edit the data of necessary print pages from the spool file stored in the spooler 602.

The scaling process determination section 803 determines (selects) the module to perform the process related to the scaling process from among the modules of the PC 10 and the printer 20 based on the print data, the print settings, the processing capacities of the PC 10 and the printer 20. When determining the process related to the scaling process is to be performed by the page editing section 802, the scaling process determination section 803 sends a request to the page editing section 802 to perform the process. Details of the functions of the scaling process determination section 803 are similar to those described above with reference to FIG. 13.

Further, the functions of the printer 20 are similar to those described above with reference to FIG. 16, and the repeated descriptions may be omitted.

By doing this, in the print control process in the EMF spooling, the scaling process determination section 803 of the print processor 603 may determine (select) which of the PC 10 and the printer 20 performs the process related to the scaling process based on the print data, the print settings, the performance capabilities of the PC 10 and the printer 20 and the like. Therefore, it becomes possible to perform appropriate load sharing of the process related to the scaling process.

The application 101, the OS 701, the printer driver 202, the printer processor 603 are achieved by, for example, the control section 11 and the main storage section 12 as a work memory. Further, the communication section 203 may be realized by, for example, the network I/F section 15. Further, the functions of the printer driver 202 may be achieved by executing the print control program by the control section 11.

Functional Examples

Pass-Through Data+Aggregation

Figure 20:
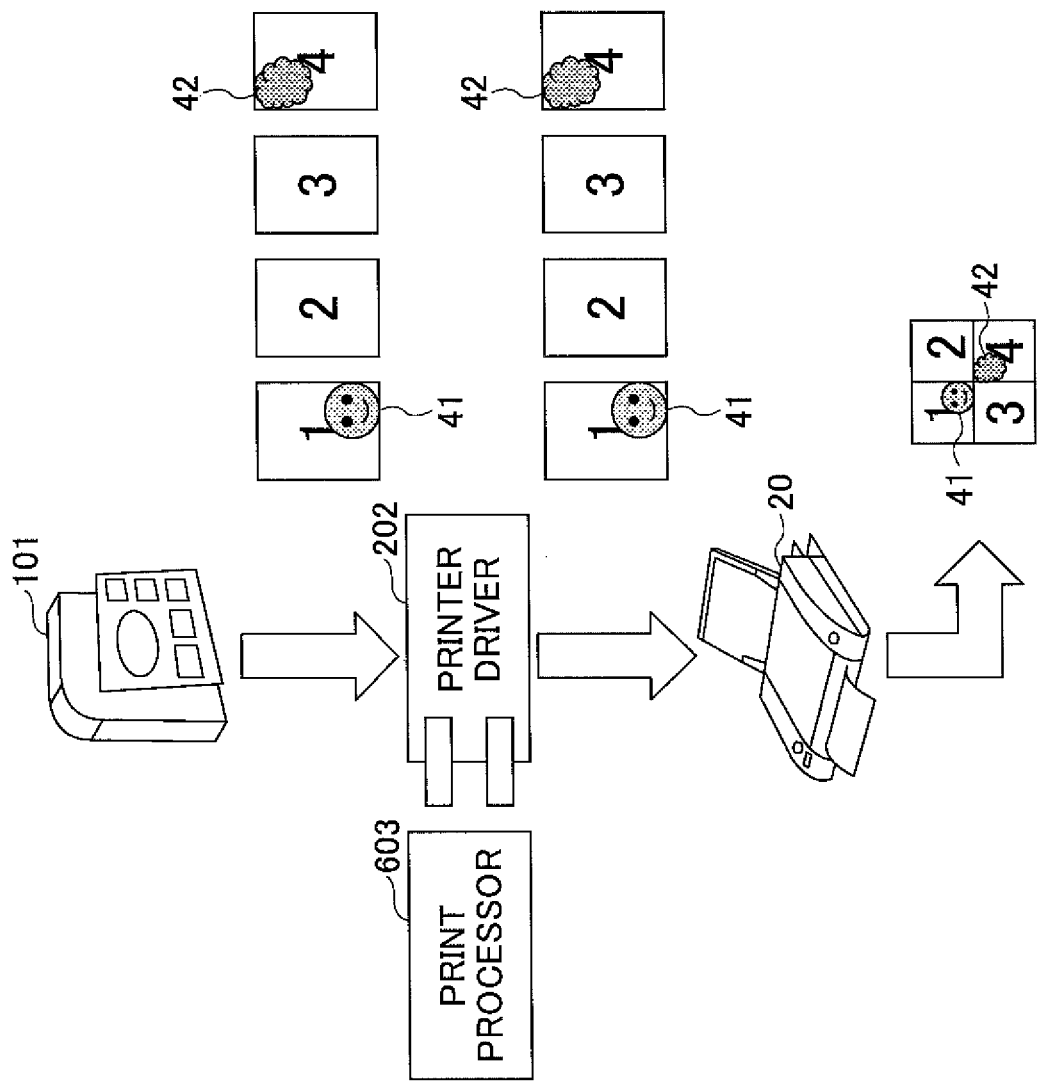
FIG. 20 is a drawing illustrating a first example of a printing function.

FIG. 20 illustrates a first functional example of the printing functions. The example of FIG. 20 illustrates how the aggregation printing may be achieved when the pass-through data are included in the print data. In the example of FIG. 20, the module that performs the scaling process (by enlarging or reducing the size of images) corresponds to the printer driver 202, the printer processor 603, and the printer 20.

In the pass-through system, it is possible to perform the imposing process on the data other than pass-through data 41 and 42 after rotating or scaling the data. However, it is not possible to rotate or scale the pass-through data 41 and 42. Therefore, if the PC 10 performs the imposing process, the print result may be distorted (incorrect). Namely, it is not possible to print data as the user intended.

Therefore, if the printer driver 202 and the print processer 603, which are the modules of the PC 10, are used to perform the imposing process, the above problem may occur. Therefore, the printer driver 202 and the print processer 603 of the PC 10 are not used to perform the scaling process, and the print data are transferred to the printer 20, so that the printer 20 performs the scaling process.

The printer 20 performs the imposing process so as to performs the 4-in-1 aggregation printing. In the above description, a case is described with reference to FIG. 20 where the imposing process is performed. However, in the variable magnification printing (process) as well, the scaling process is not performed by the PC 11 but the scaling process is performed by the printer 20.

By doing this, when the pass-through data are included in the print data, the printer 20 is basically used to perform the imposing process. Therefore, it may become possible to print data as the user intended.

Aggregation+Binding

Figure 21:
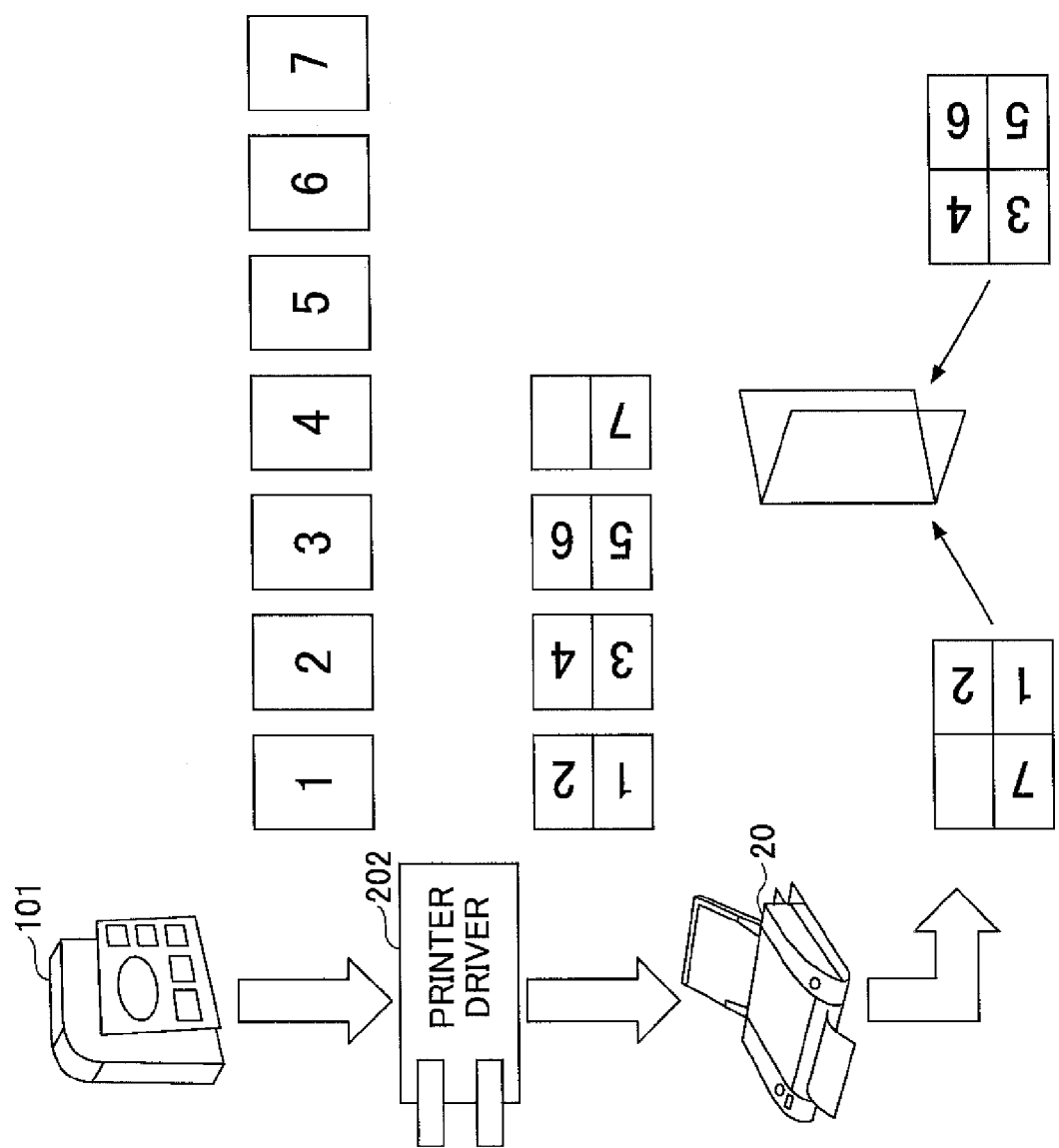
FIG. 21 is a drawing illustrating a second example of the printing function.

FIG. 21 illustrates a second functional example of the printing functions. The example of FIG. 21 illustrates how the load of the functions of the aggregation printing and the binding printing are shared between the PC 10 and the printer 20. In the example of FIG. 21, it is assumed that the processing capacity of the PC 10 is lower and the printer 20 has a storage medium.

In this case, the determination section 407 determines that the aggregation printing from among the aggregation printing and the binding printing is to be performed by the PC 10 and the binding printing is to be performed by the printer 20, the processing load of the aggregation printing being lower than processing load of the binding printing. To perform the binding printing, the storage medium may be required. Therefore, the determination section 407 determines that the binding printing is to be performed by the printer 20 because the printer 20 includes such a storage medium.

The printer driver 202 performs the aggregation printing on the print data. Therefore, the printer driver 202 adds a command indicating the completion of the aggregation to the PDL command by the print job, the physical sheet, or the logical page, and transmits the PDL command with the added command to the printer 20 via the spooler. Further, the printer driver 202 may delete the command indicating the aggregation and transmit only the command indicating the binding to the printer 20.

Pass-Through Data+Aggregation+Double Side

Figure 22:
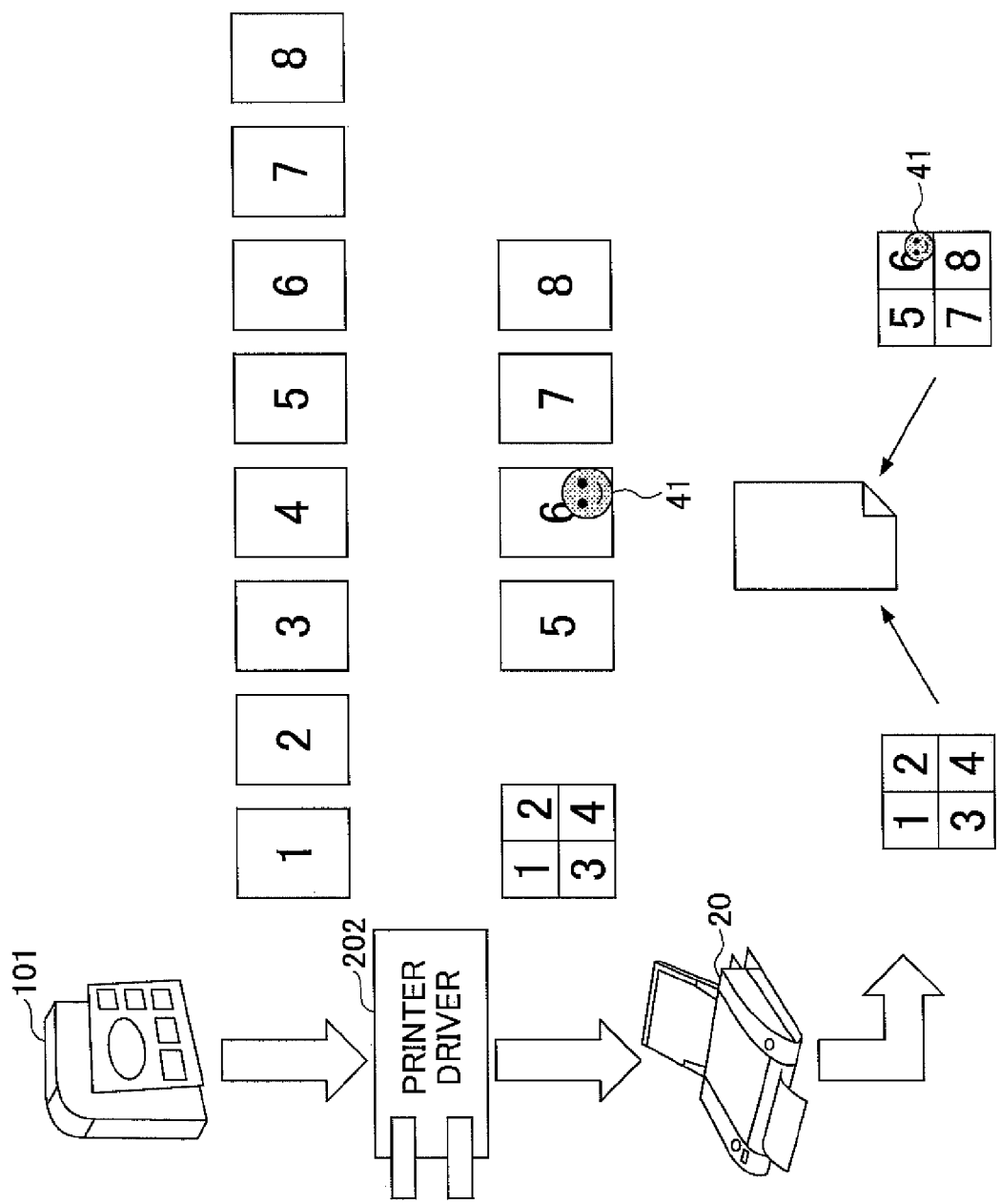
FIG. 22 is a drawing illustrating a third example of the printing function.

FIG. 22 illustrates a third functional example of the printing functions. The example of FIG. 22 illustrates when the pass-through data are included in the print data, how the load of the functions of the aggregation printing and the double side printing are shared between the PC 10 and the printer 20. In the example of FIG. 22, it is assumed that the processing capacity of the PC 10 is higher than that of the printer 20 and the printer 20 includes the storage medium.

Further, it is assumed that there are no pass-though data on the pages 1-4 which are printed on the front surface but the pass-though data 41 exist on page 6 which are printed on the rear surface in double side printing.

In this case, it may be desired that the determination section 407 determines that the scaling process is to be performed by the PC 10 because the processing capacity of the PC is higher. However, due to the pass-through data 41 on page 6, the determination section 407 determines that the aggregation of only the front surface is to be performed by PC 10.

In this case, the printer driver 202 adds a command indicating the completion of the aggregation up to page 4 to the PDL command by the print job, the physical sheet, or the logical page, and transmits the PDL command with the added command to the printer 20 via the spooler. Further, the printer driver 202 converts four-page data on the rear surface into the PDL command and transmits the PDL command to the printer 20 via the spooler.

The printer 20 analyzes the command and recognizes the completion of the aggregation on the front surface side up to page 4. Therefore, the printer 20 directly prints the front surface onto a physical sheet, and performs the aggregation printing with respect to the four pages on the rear surface side.

Reverse Order

Figure 23:
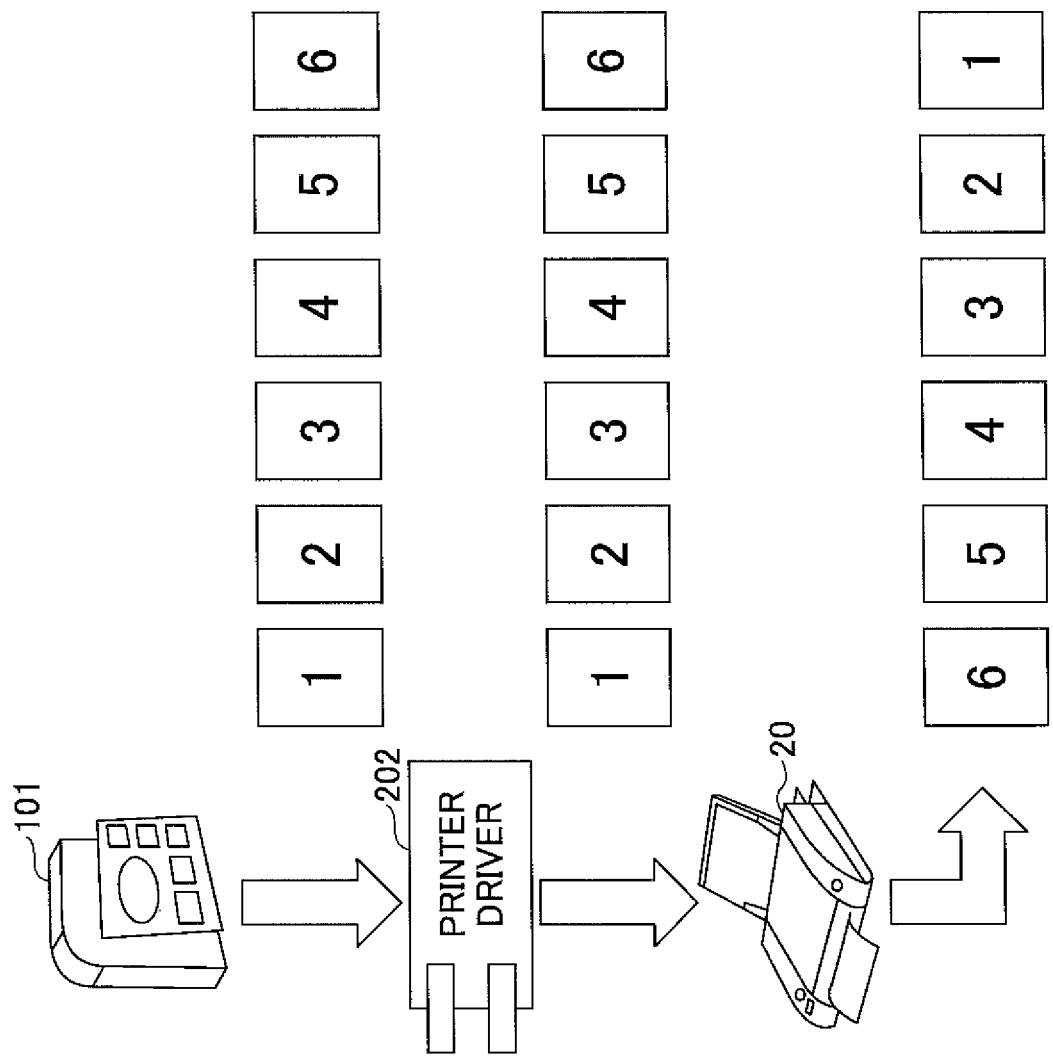
FIG. 23 is a drawing illustrating a fourth example of the printing function.

FIG. 23 illustrates a fourth functional example of the printing functions. The example of FIG. 23 illustrates how the functions of reverse order page printing are determined. In the example of FIG. 23, it is assumed that the printer 20 includes the storage medium.

The application 101 transmits the print data to the printer driver 202 via the OS. Here, the determination section 407 determines that the reverse order process is to be performed by the printer 20 because the printer 20 includes the storage medium. The printer driver does not perform any process related to the page order, and transmits the print data to the printer 20.

Upon receiving the print data, the printer 20 performs a process of reversing the page order and outputs the pages on a physical sheet.

In the examples of FIGS. 21 to 23, the print control processes in the RAW spooling are described. On the other hand, in the print control processes in the EMF spooling, the print processor 603 performs the determination process and the imposing process.

By doing this, in any of the RAW spooling and the EMF spooling, it may become possible to determine an appropriate module to perform the function related to the scaling function.

Selection Screen

Figure 24:
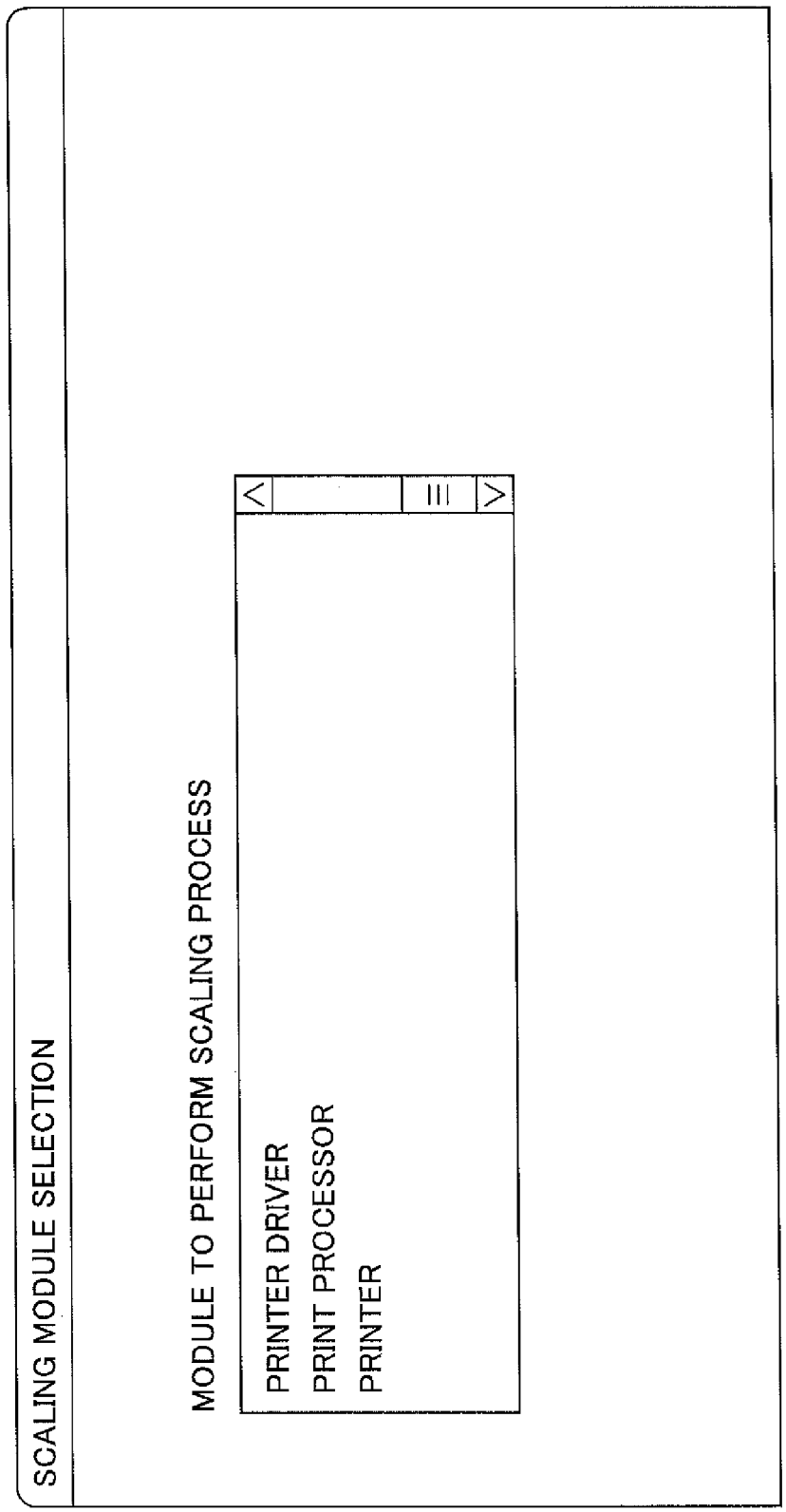
FIG. 24 is a drawing illustrating an example of a module selection screen.

Next, a case where a user determines the appropriate module to perform the process related to the scaling process is described. FIG. 24 illustrates an example of a selection screen to select the module. In the example of FIG. 24, the user may select the module to perform the process related to the scaling process using the GUI. In the selection using the screen of FIG. 24, the user may select in advance or may select before pressing the print execution button.

Operation

Figure 25:
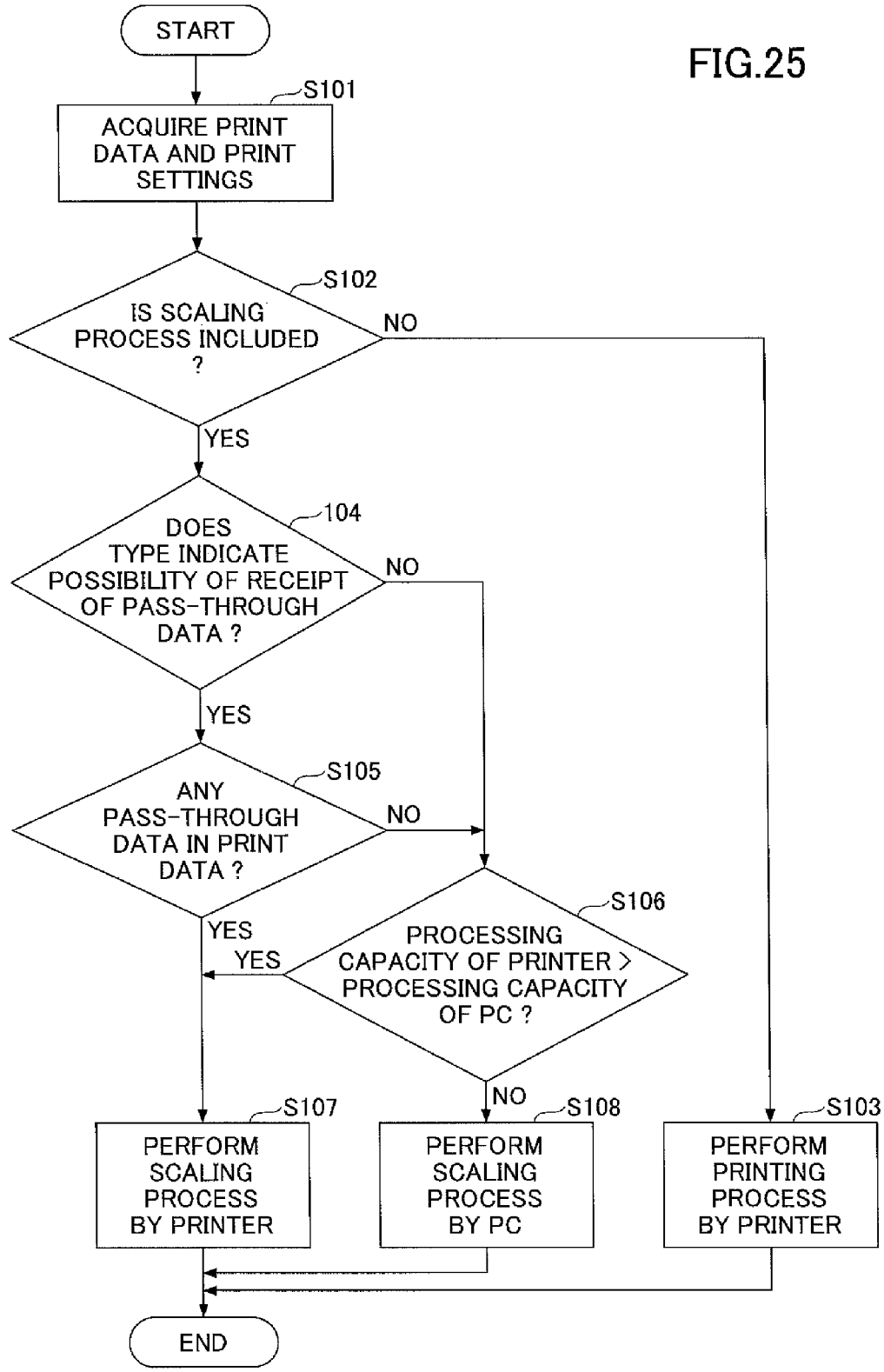
FIG. 25 is a flowchart illustrating an example of a print control process.

Next, the operations of the information processing apparatus 10 are described. FIG. 25 is a example flowchart of the print control process. The print control process of FIG. 25 is the process to select (determine) the module to perform the scaling process.

In step S101, the acquisition section 401 acquires the print data provided (instructed) from each application to print. The acquisition section 401 acquires the print data and the print settings from the application 104 via the OS.

In step S102, the process determination section 402 determines whether there is the print setting related to the scaling process within the acquired print settings. Here, the print setting related to the scaling refers to the aggregation (printing), the binding (printing), the variable magnification (printing) or the like.

When determining that there is the print setting related to the scaling process (YES in step S102), the process goes to step S104. On the other hand, when determining that there is no print setting related to the scaling process (NO in step S102), the process goes to step S103.

In step S103, the determination section 407 determines that the process related to the scaling process is to be performed by the printer 20.

In step S104, the first determination section 404 determines whether the type of the print data indicates that the print data may include (receive) the pass-through data. When determining that the type indicates that the pass-through data may be received (included) (YES in step S104), the process goes to step S105. On the other hand, when determining that the type indicates that the pass-through data are not to be received (included) (NO in step S104), the process goes to step S106.

In step S105, the second determination section 405 determines whether there are pass-through data in the print data. When determining that there are pass-through data in the print data (YES in step S105), the process goes to step S107. On the other hand, when determining that there are no pass-through data in the print data (NO in step S105), the process goes to step S106.

In step S106, the comparison section 406 compares the processing capacity of the printer 20 and the processing capacity of the PC 10. To that end, for example, the comparison section 406 determines whether the processing capacity of the printer 20 is higher than the processing capacity of the PC 10.

When determining that the processing capacity of the printer 20 is higher than (or equal to) the processing capacity of the PC 10 (YES in step S106), the process goes to step S107. On the other hand, when determining that the processing capacity of the printer 20 is lower than the processing capacity of the PC 10 (NO in step S106), the process goes to step S108.

In step S107, the determination section 407 determines that the scaling process is to be performed by the printer 20.

In step S108, the determination section 407 determines that the scaling process is to be performed by the PC 10.

Further, the process of FIG. 25 is performed by the scaling process determination section 303 of the printer driver 202 in the case of the RAW spooling and by the scaling process determination section 803 of the print processor 603 in the case of the EMF spooling.

Depending on the spooling type, the flow of the print data may change. Further, depending on the spooling type, it may also change whether the process related to the scaling process is to be performed by the printer driver in the PC alone or by the print processor as well. Namely, even when the determination logic of the module determination process is unchanged, the module to make the determination may change depending on the spooling type.

Further, if it is known in advance that there are no pass-through data included, the scaling process determination section may make a comparison in step S106 after determining that there is the print setting related to the scaling process (YES in step S102).

As described above, according to an embodiment, it may become possible to determine (select) an appropriate module to perform the process related to the scaling process. Further, according to an embodiment, even when the print data including the pass-through data are printed, it may become possible to output an output results as the user intended.

MODIFIED EXAMPLE

The program to be executed by the PC in embodiments may be provided by a computer-readable storage medium such as a Compact Disc Read Only Memory (CD-ROM), a Flexible Disk (FD), a Compact Disc Recordable (CD-R), a Digital Versatile Disk (DVD) and the like in an installable format or an executable file.

Further, the program to be executed by the PC in an embodiment may be stored in a computer connected to a network such as the Internet, so that the program may be provided by being downloaded via the network.

Further, the program to be executed by the PC in an embodiment may be provided by embedding the program into a ROM or the like.

The program to be executed by the PC in an embodiment may be provided as a module having the above described sections. In practical hardware, for example, the control section 11 (processor) reads the program from the auxiliary storage section 13 or the like and executes the program. By doing this, the functions described above are loaded into the main storage section 12, so that the functions are formed in the main storage section 12.

According to an embodiment, a print control program for an information processing apparatus is connected to an image forming apparatus via a network. The print control program causes a computer to execute an acquisition step of acquiring print data and print settings corresponding to the print data from one or more applications; a process determination step of determining whether a process related to a scaling process is included in the print settings; a comparison step of, when determining that the process related to a scaling process is included in the print settings, comparing a processing capacity of the image forming apparatus with a processing capacity of the information processing apparatus; and a determination step of determining whether the process related to the scaling process is to be performed by the image forming apparatus or by the information processing apparatus based on a comparison result in the comparison step.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control method for an information processing apparatus connected to an image forming apparatus via a network, the print control method comprising:
   acquiring print data and print settings corresponding to the print data from one or more applications;
   acquiring first information indicating a processing capacity of the image forming apparatus from the image forming apparatus and second information indicating the processing capacity of the information processing apparatus;
   determining whether a process related to a scaling process is included in the print settings;
   comparing, the first information with the second information, when it is determined that the process related to a scaling process is included in the print settings; and
   determining whether the process related to the scaling process is to be performed by the image forming apparatus or the information processing apparatus based on a comparison result of the comparing step, wherein
      the first information includes information related to the processing capacity and a load status of the image forming apparatus;
      the second information includes information related to the processing capacity and a load status of the information processing apparatus;
      the comparing includes,
         calculating a first score based on the processing capacity and the load status of the image forming apparatus included in the first information, and
         calculating a second score based on the processing capacity and the load status of the information processing apparatus included in the second information; and wherein
      the print control method further includes determining which of the image forming apparatus and the information processing apparatus has a higher processing capacity based on a comparison between the first score and the second score.

2. The print control method according to claim 1, further comprising:
   converting the print data into a second print data readable by the image forming apparatus,
   wherein the converting step includes
      the determining step, and
      editing the print data by performing the scaling process on the print data, when it is determined that the process related to the scaling process is to be performed by the information processing apparatus in the determining step.

3. The print control method according to claim 2, further comprising:
   an image processing step of performing an imposing process on the print data when the print data include EMF (Enhanced Meta File) data,
   wherein the image processing step includes
      the determination unit, and
      editing the print data by performing the scaling process on the print data, when determining that the process related to the scaling process is to be performed by the information processing apparatus in the determining step.

4. The print control method according to claim 3,
   wherein when the print data are edited in the editing step in the drawing step or in the editing step in the image processing step, in the converting step, a command indicating whether the scaling process is performed by the information processing apparatus is output to the image forming apparatus for each of print jobs, physical sheets, or logical pages.

5. An information processing apparatus connected to an image forming apparatus via a network, the information processing apparatus comprising:
   an acquisition unit configured to acquire print data and print settings corresponding to the print data from one or more applications;
   an information acquisition unit configured to acquire first information indicating a processing capacity of the image forming apparatus from the image forming apparatus and second information indicating the processing capacity of the information processing apparatus;
   a process determination unit configured to determine whether a process related to a scaling process is included in the print settings;
   a comparison unit configured to the first information with the second information acquired by the information acquisition unit, when it is determined that the process related to a scaling process is included in the print settings; and
   a determination unit configured to determine whether the process related to the scaling process is to be performed by the image forming apparatus or the information processing apparatus based on a comparison result by the comparison unit, wherein
      the first information includes information related to the processing capacity and a load status of the image forming apparatus;
      the second information includes information related to the processing capacity and a load status of the information processing apparatus;
      the comparison includes,
         a first calculation unit configured to calculate a first score based on the processing capacity and the load status of the image forming apparatus included in the first information, and
         a second calculation unit configured to calculate a second score based on the processing capacity and the load status of the information processing apparatus included in the second information; and
      wherein the image processing apparatus is further configured to determine which of the image forming apparatus and the information processing apparatus has a higher processing capacity based on a comparison between the first score and the second score.

6. The information processing apparatus according to claim 5, further comprising:
   a drawing unit configured to convert the print data into a second print data readable by the image forming apparatus,
   wherein the drawing unit includes
      the determination unit, and
      an editing unit configured to, when the determination unit determines that the process related to the scaling process is to be performed by the information processing apparatus, edit the print data by performing the scaling process on the print data.

7. The information processing apparatus according to claim 6, further comprising:
   an image processing unit configured to perform an imposing process on the print data when the print data include EMF (Enhanced Meta File) data, wherein the image processing unit includes
the determination unit, and
an editing unit configured to, when the determination unit determines that the process related to the scaling process is to be performed by the information processing apparatus, edit the print data by performing the scaling process on the print data.

8. The information processing apparatus according to claim 7,
wherein when the print data are edited by the editing unit of the drawing unit or by the editing unit of the image processing unit, the drawing unit is configured to output a command indicating whether the scaling process is performed by the information processing apparatus to the image forming apparatus for each of print jobs, physical sheets, or logical pages.

9. A non-transitory recording medium storing thereon a print control program for causing a computer to execute the print control method according to claim 1.

* * * * *